United States Patent [19]
Park

[11] Patent Number: 5,816,972
[45] Date of Patent: Oct. 6, 1998

[54] TRANSMISSION WITH SIMPLE PLANETARY GEAR SETS

[75] Inventor: Jong-Sul Park, Seoul, Rep. of Korea

[73] Assignee: Hyundai Motor Company, Seoul, Rep. of Korea

[21] Appl. No.: 752,435

[22] Filed: Nov. 14, 1996

[30] Foreign Application Priority Data

| Nov. 23, 1995 | [KR] | Rep. of Korea | 1995/43367 |
| Nov. 23, 1995 | [KR] | Rep. of Korea | 1995/43368 |
| Dec. 11, 1995 | [KR] | Rep. of Korea | 1995/48204 |
| Dec. 11, 1995 | [KR] | Rep. of Korea | 1995/48205 |
| Dec. 11, 1995 | [KR] | Rep. of Korea | 1995/48206 |
| Dec. 11, 1995 | [KR] | Rep. of Korea | 1995/48213 |

[51] Int. Cl.$^6$ ........................................ F16H 3/62
[52] U.S. Cl. .......................... 475/284; 475/271; 475/296
[58] Field of Search ........................ 475/271, 282, 475/284, 296

[56] References Cited

U.S. PATENT DOCUMENTS

| 2,873,624 | 2/1959 | Simpson | 475/284 |
| 4,483,215 | 11/1984 | Ishimaru et al. | 475/284 |
| 5,073,160 | 12/1991 | Oshidari | 475/281 |
| 5,098,357 | 3/1992 | Asada et al. | 475/284 |
| 5,122,103 | 6/1992 | Nakawaki et al. | 475/284 |
| 5,141,477 | 8/1992 | Oshidari | 475/330 |
| 5,194,055 | 3/1993 | Oshidari | 475/281 |
| 5,203,862 | 4/1993 | Nishida et al. | 475/282 |
| 5,224,908 | 7/1993 | Nishida et al. | 475/282 |
| 5,567,201 | 10/1996 | Ross | 475/280 |
| 5,692,988 | 12/1997 | Beim et al. | 475/284 |

FOREIGN PATENT DOCUMENTS 2 066 391  7/1981  United Kingdom .

Primary Examiner—Charles A. Marmor
Assistant Examiner—Sherry Lynn Estremsky
Attorney, Agent, or Firm—Finnegan, Henderson, Farabow, Garrett & Dunner, L.L.P.

[57] ABSTRACT

A transmission includes a first simple planetary gear set having first, second, and third elements, the first element of the first gear set receiving rotational motion input to the transmission, and a second simple planetary gear set having first, second, and third elements, the first element of the second gear set outputting rotational motion from the transmission and the third element of the second gear set being connected to the third element of the first gear set. The elements of the first gear set include a sun gear, a first carrier, and a first ring gear, and the elements of the second gear set include a second sun gear, a second carrier, and a second ring gear. A first clutch selectively couples the second element of the first gear set to the second element of the second gear set. A second clutch selectively couples the first element of the first gear set to the second element of the second gear set. A third clutch selectively couples two elements selected from the group consisting of the first, second, and third elements of the first gear set and the third element of the second gear set. A first brake selectively brakes the second element of the second gear set, and a second brake selectively brakes the third element of the second gear set.

28 Claims, 20 Drawing Sheets

| FRICTION LOSS | | | | | | |
|---|---|---|---|---|---|---|
| | BRAKE 56 | BRAKE 58 | CLUTCH 50 | CLUTCH 52 | CLUTCH 54 | TOTAL |
| 1st DRIVING SPEED | | 0.765 | | 1.000 | 1.765 | 3.530 |
| 2nd DRIVING SPEED | 0.433 | | | 0.567 | 1.000 | 2.000 |
| 3rd DRIVING SPEED | 1.000 | 1.000 | | | | 2.000 |
| 4th DRIVING SPEED | 1.000 | | 1.308 | | 1.000 | 3.308 |
| REVERSE | | 1.000 | 2.308 | 1.000 | | 4.308 |
| TOTAL | 2.433 | 2.765 | 3.616 | 2.567 | 3.765 | 15.146 |

| FRICTION LOSS | | | | | | | |
|---|---|---|---|---|---|---|---|
| | BRAKE 156 | BRAKE 158 | CLUTCH 150 | CLUTCH 152 | CLUTCH 154 | TOTAL | REDUCTION OF FRICTION LOSS |
| 1st DRIVING SPEED | | 0.765 | | 1.000 | 0.765 | 2.530 | 28% |
| 2nd DRIVING SPEED | 0.433 | | | 0.567 | 0.433 | 1.433 | 28% |
| 3rd DRIVING SPEED | 1.000 | 1.000 | | | | 2.000 | |
| 4th DRIVING SPEED | 1.000 | | 0.566 | | 0.433 | 1.999 | 40% |
| REVERSE | | 1.000 | 1.000 | 1.000 | | 3.000 | 30% |
| TOTAL | 2.433 | 2.765 | 1.566 | 2.567 | 1.631 | 10.962 | 28% |
| REDUCTION OF FRICTION LOSS | | | 57% | 57% | 28% | | |

| | FRICTION LOSS | | | | | | |
|---|---|---|---|---|---|---|---|
| | BRAKE 256 | BRAKE 258 | CLUTCH 250 | CLUTCH 252 | CLUTCH 254 | TOTAL | REDUCTION OF FRICTION LOSS |
| 1st DRIVING SPEED | | 0.765 | | 1.000 | 1.000 | 2.765 | 22% |
| 2nd DRIVING SPEED | 0.433 | | | 0.567 | 0.567 | 1.567 | 22% |
| 3rd DRIVING SPEED | 1.000 | 1.000 | | | | 2.000 | |
| 4th DRIVING SPEED | 1.000 | | 0.566 | | 0.566 | 2.132 | 36% |
| REVERSE | | 1.000 | 1.000 | 1.000 | | 3.000 | 30% |
| TOTAL | 2.433 | 2.765 | 1.566 | 2.567 | 2.133 | 11.464 | 24% |
| REDUCTION OF FRICTION LOSS | | | 57% | 43% | 24% | | |

| FRICTION LOSS | | | | | | | |
|---|---|---|---|---|---|---|---|
| | BRAKE 356 | BRAKE 358 | CLUTCH 350 | CLUTCH 352 | CLUTCH 354 | TOTAL | REDUCTION OF FRICTION LOSS |
| 1st DRIVING SPEED | | 0.765 | | 1.000 | 1.765 | 3.530 | |
| 2nd DRIVING SPEED | 0.433 | | | 0.567 | 1.000 | 2.000 | |
| 3rd DRIVING SPEED | 1.000 | 1.000 | | | | 2.000 | |
| 4th DRIVING SPEED | 1.000 | | 0.566 | | 1.000 | 2.566 | 22% |
| REVERSE | | 1.000 | 1.000 | 1.000 | | 3.000 | 30% |
| TOTAL | 2.433 | 2.765 | 1.566 | 2.567 | 3.765 | 13.096 | 14% |
| REDUCTION OF FRICTION LOSS | | | 57% | | | 14% | |

| FRICTION LOSS | | | | | | | |
|---|---|---|---|---|---|---|---|
| | BRAKE 456 | BRAKE 458 | CLUTCH 450 | CLUTCH 452 | CLUTCH 454 | TOTAL | REDUCTION OF FRICTION LOSS |
| 1st DRIVING SPEED | | 0.765 | | 1.200 | 1.000 | 2.765 | 22% |
| 2nd DRIVING SPEED | 0.433 | | | 0.567 | 0.567 | 1.567 | 22% |
| 3rd DRIVING SPEED | 1.000 | 1.000 | | | | 2.000 | |
| 4th DRIVING SPEED | 1.000 | | 0.566 | | 0.566 | 2.132 | 36% |
| REVERSE | | 1.000 | 1.000 | | 1.000 | 3.000 | 30% |
| TOTAL | 2.433 | 2.765 | 1.566 | 2.567 | 2.133 | 11.464 | 24% |
| REDUCTION OF FRICTION LOSS | | | 57% | 43% | 24% | | |

| FRICTION LOSS | | | | | | | |
|---|---|---|---|---|---|---|---|
| | BRAKE 556 | BRAKE 558 | CLUTCH 550 | CLUTCH 552 | CLUTCH 554 | TOTAL | REDUCTION OF FRICTION LOSS |
| 1st DRIVING SPEED | | 0.765 | | 1.000 | 0.765 | 2.530 | 28% |
| 2nd DRIVING SPEED | 0.433 | | | 0.567 | 0.433 | 1.433 | 28% |
| 3rd DRIVING SPEED | 1.000 | 1.000 | | | | 2.000 | |
| 4th DRIVING SPEED | 1.000 | | 0.566 | | 0.433 | 1.999 | 40% |
| REVERSE | | 1.000 | 1.000 | 1.000 | | 3.000 | 30% |
| TOTAL | 2.433 | 2.765 | 1.566 | 2.567 | 1.631 | 10.962 | 28% |
| REDUCTION OF FRICTION LOSS | | | 57% | 57% | 28% | | |

| FRICTION LOSS |||||||||
|---|---|---|---|---|---|---|---|
| | BRAKE 656 | BRAKE 658 | CLUTCH 650 | CLUTCH 652 | CLUTCH 654 | TOTAL | REDUCTION OF FRICTION LOSS |
| 1st DRIVING SPEED | | 0.765 | | 1.000 | 1.765 | 3.530 | |
| 2nd DRIVING SPEED | 0.433 | | | 0.567 | 1.000 | 2.000 | |
| 3rd DRIVING SPEED | 1.000 | 1.000 | | | | 2.000 | |
| 4th DRIVING SPEED | 1.000 | | 0.566 | | 1.000 | 2.566 | 22% |
| REVERSE | | 1.000 | 1.000 | 1.000 | | 3.000 | 30% |
| TOTAL | 2.433 | 2.765 | 1.566 | 2.567 | 3.765 | 13.096 | 14% |
| REDUCTION OF FRICTION LOSS | | | 57% | | | 14% | |

| FRICTION LOSS | | | | | | | |
|---|---|---|---|---|---|---|---|
| | BRAKE 756 | BRAKE 758 | CLUTCH 750 | CLUTCH 752 | CLUTCH 754 | TOTAL | REDUCTION OF FRICTION LOSS |
| 1st DRIVING SPEED | | 0.765 | | 1.000 | 1.765 | 2.530 | 28% |
| 2nd DRIVING SPEED | 0.433 | | | 0.567 | 0.433 | 1.433 | 28% |
| 3rd DRIVING SPEED | 1.000 | 1.000 | | | | 2.000 | |
| 4th DRIVING SPEED | 1.000 | | 0.566 | | 0.433 | 1.999 | 40% |
| REVERSE | | 1.000 | 1.000 | 1.000 | | 3.000 | 30% |
| TOTAL | 2.433 | 2.765 | 1.566 | 2.567 | 1.631 | 10.962 | 28% |
| REDUCTION OF FRICTION LOSS | | | 57% | | 57% | 28% | |

| | FRICTION LOSS | | | | | | |
|---|---|---|---|---|---|---|---|
| | BRAKE 856 | BRAKE 858 | CLUTCH 850 | CLUTCH 852 | CLUTCH 854 | TOTAL | REDUCTION OF FRICTION LOSS |
| 1st DRIVING SPEED | | 0.765 | | 1.000 | 1.000 | 2.765 | 22% |
| 2nd DRIVING SPEED | 0.433 | | | 0.567 | 0.567 | 1.567 | 22% |
| 3rd DRIVING SPEED | 1.000 | 1.000 | | | | 2.000 | |
| 4th DRIVING SPEED | 1.000 | | 0.566 | | 0.566 | 2.132 | 36% |
| REVERSE | | 1.000 | 1.000 | 1.000 | | 3.000 | 30% |
| TOTAL | 2.433 | 2.765 | 1.566 | 2.567 | 2.133 | 11.464 | 24% |
| REDUCTION OF FRICTION LOSS | | | 57% | 43% | 24% | | |

| FRICTION LOSS | | | | | | | |
|---|---|---|---|---|---|---|---|
| | BRAKE 956 | BRAKE 958 | CLUTCH 950 | CLUTCH 952 | CLUTCH 954 | TOTAL | REDUCTION OF FRICTION LOSS |
| 1st DRIVING SPEED | | 0.765 | | 1.000 | 1.765 | 3.530 | |
| 2nd DRIVING SPEED | 0.433 | | | 0.567 | 1.000 | 2.000 | |
| 3rd DRIVING SPEED | 1.000 | 1.000 | | | | 2.000 | |
| 4th DRIVING SPEED | 1.000 | | 0.566 | | 1.000 | 2.566 | 22% |
| REVERSE | | 1.000 | 1.000 | 1.000 | | 3.000 | 30% |
| TOTAL | 2.433 | 2.765 | 1.566 | 2.567 | 3.765 | 13.096 | 14% |
| REDUCTION OF FRICTION LOSS | | | 57% | | | 14% | |

| FRICTION LOSS | | | | | | | |
|---|---|---|---|---|---|---|---|
| | BRAKE 1056 | BRAKE 1058 | CLUTCH 1050 | CLUTCH 1052 | CLUTCH 1054 | TOTAL | REDUCTION OF FRICTION LOSS |
| 1st DRIVING SPEED | | 0.765 | | 1.000 | 1.765 | 3.530 | |
| 2nd DRIVING SPEED | 0.433 | | | 0.567 | 1.000 | 2.000 | |
| 3rd DRIVING SPEED | 1.000 | 1.000 | | | | 2.000 | |
| 4th DRIVING SPEED | 1.000 | | 0.566 | | 1.000 | 2.566 | 22% |
| REVERSE | | 1.000 | 1.000 | 1.000 | | 3.000 | 30% |
| TOTAL | 2.433 | 2.765 | 1.566 | 2.567 | 3.765 | 13.096 | 14% |
| REDUCTION OF FRICTION LOSS | | | 57% | | | 14% | |

| FRICTION LOSS | | | | | | | |
|---|---|---|---|---|---|---|---|
| | BRAKE 1156 | BRAKE 1158 | CLUTCH 1150 | CLUTCH 1152 | CLUTCH 1154 | TOTAL | REDUCTION OF FRICTION LOSS |
| 1st DRIVING SPEED | | 0.765 | | 1.000 | 1.000 | 2.765 | 22% |
| 2nd DRIVING SPEED | 0.433 | | | 0.567 | 0.567 | 1.567 | 22% |
| 3rd DRIVING SPEED | 1.000 | 1.000 | | | | 2.000 | |
| 4th DRIVING SPEED | 1.000 | | 0.566 | | 0.566 | 2.132 | 36% |
| REVERSE | | 1.000 | 1.000 | 1.000 | | 3.000 | 30% |
| TOTAL | 2.433 | 2.765 | 1.566 | 2.567 | 2.133 | 11.464 | 24% |
| REDUCTION OF FRICTION LOSS | | | 57% | | 43% | 24% | |

| FRICTION LOSS | | | | | | | |
|---|---|---|---|---|---|---|---|
| | BRAKE 1256 | BRAKE 1258 | CLUTCH 1250 | CLUTCH 1252 | CLUTCH 1254 | TOTAL | REDUCTION OF FRICTION LOSS |
| 1st DRIVING SPEED | | 0.765 | | 1.000 | 0.765 | 2.530 | 28% |
| 2nd DRIVING SPEED | 0.433 | | | 0.567 | 0.433 | 1.433 | 28% |
| 3rd DRIVING SPEED | 1.000 | 1.000 | | | | 2.000 | |
| 4th DRIVING SPEED | 1.000 | | 0.566 | | 0.433 | 1.999 | 40% |
| REVERSE | | 1.000 | 1.000 | 1.000 | | 3.000 | 30% |
| TOTAL | 2.433 | 2.765 | 1.566 | 2.567 | 1.631 | 10.962 | 28% |
| REDUCTION OF FRICTION LOSS | | | 57% | | 57% | 28% | |

| FRICTION LOSS | | | | | | | |
|---|---|---|---|---|---|---|---|
| | BRAKE 1356 | BRAKE 1358 | CLUTCH 1350 | CLUTCH 1352 | CLUTCH 1354 | TOTAL | REDUCTION OF FRICTION LOSS |
| 1st DRIVING SPEED | | 0.765 | | 1.000 | 0.765 | 2.530 | 28% |
| 2nd DRIVING SPEED | 0.433 | | | 0.567 | 0.433 | 1.433 | 28% |
| 3rd DRIVING SPEED | 1.000 | 1.000 | | | | 2.000 | |
| 4th DRIVING SPEED | 1.000 | | 0.566 | | 0.433 | 1.999 | 40% |
| REVERSE | | 1.000 | 1.000 | 1.000 | | 3.000 | 30% |
| TOTAL | 2.433 | 2.765 | 1.566 | 2.567 | 1.631 | 10.962 | 28% |
| REDUCTION OF FRICTION LOSS | | | 57% | | 57% | 28% | |

| FRICTION LOSS | | | | | | | |
|---|---|---|---|---|---|---|---|
| | BRAKE 1456 | BRAKE 1458 | CLUTCH 1450 | CLUTCH 1452 | CLUTCH 1454 | TOTAL | REDUCTION OF FRICTION LOSS |
| 1st DRIVING SPEED | | 0.765 | | 1.000 | 1.000 | 2.765 | 22% |
| 2nd DRIVING SPEED | 0.433 | | | 0.567 | 0.567 | 1.567 | 22% |
| 3rd DRIVING SPEED | 1.000 | 1.000 | | | | 2.000 | |
| 4th DRIVING SPEED | 1.000 | | 0.566 | | 0.566 | 2.132 | 36% |
| REVERSE | | 1.000 | 1.000 | 1.000 | | 3.000 | 30% |
| TOTAL | 2.433 | 2.765 | 1.566 | 2.567 | 2.133 | 11.464 | 24% |
| REDUCTION OF FRICTION LOSS | | | 57% | | 43% | 24% | |

| FRICTION LOSS | | | | | | | |
|---|---|---|---|---|---|---|---|
| | BRAKE 1556 | BRAKE 1558 | CLUTCH 1550 | CLUTCH 1552 | CLUTCH 1554 | TOTAL | REDUCTION OF FRICTION LOSS |
| 1st DRIVING SPEED | | 0.765 | | 1.000 | 1.765 | 3.530 | |
| 2nd DRIVING SPEED | 0.433 | | | 0.567 | 1.000 | 2.000 | |
| 3rd DRIVING SPEED | 1.000 | 1.000 | | | | 2.000 | |
| 4th DRIVING SPEED | 1.000 | | 0.566 | | 1.000 | 2.566 | 22% |
| REVERSE | | 1.000 | 1.000 | 1.000 | | 3.000 | 30% |
| TOTAL | 2.433 | 2.765 | 1.566 | 2.567 | 3.765 | 13.096 | 14% |
| REDUCTION OF FRICTION LOSS | | | 27% | | 14% | | |

| FRICTION LOSS | | | | | | | |
|---|---|---|---|---|---|---|---|
| | BRAKE 1656 | BRAKE 1658 | CLUTCH 1650 | CLUTCH 1652 | CLUTCH 1654 | TOTAL | REDUCTION OF FRICTION LOSS |
| 1st DRIVING SPEED | | 0.765 | | 1.000 | 1.765 | 3.530 | |
| 2nd DRIVING SPEED | 0.433 | | | 0.567 | 1.000 | 2.000 | |
| 3rd DRIVING SPEED | 1.000 | 1.000 | | | | 2.000 | |
| 4th DRIVING SPEED | 1.000 | | 0.566 | | 1.000 | 2.566 | 22% |
| REVERSE | | 1.000 | 1.000 | 1.000 | | 3.000 | 30% |
| TOTAL | 2.433 | 2.765 | 1.566 | 2.567 | 3.765 | 13.096 | 14% |
| REDUCTION OF FRICTION LOSS | | | 57% | | | 14% | |

| FRICTION LOSS | | | | | | | |
|---|---|---|---|---|---|---|---|
| | BRAKE 1756 | BRAKE 1758 | CLUTCH 1750 | CLUTCH 1752 | CLUTCH 1754 | TOTAL | REDUCTION OF FRICTION LOSS |
| 1st DRIVING SPEED | | 0.765 | | 1.000 | 1.000 | 2.765 | 22% |
| 2nd DRIVING SPEED | 0.433 | | | 0.567 | 0.567 | 1.567 | 22% |
| 3rd DRIVING SPEED | 1.000 | 1.000 | | | | 2.000 | |
| 4th DRIVING SPEED | 1.000 | | 0.566 | | 0.566 | 2.132 | 46% |
| REVERSE | | 1.000 | 1.000 | 1.000 | | 3.000 | 30% |
| TOTAL | 2.433 | 2.765 | 1.566 | 2.567 | 2.133 | 11.464 | 24% |
| REDUCTION OF FRICTION LOSS | | | 57% | 43% | 24% | | |

| FRICTION LOSS | | | | | | | |
|---|---|---|---|---|---|---|---|
| | BRAKE 1856 | BRAKE 1858 | CLUTCH 1850 | CLUTCH 1852 | CLUTCH 1854 | TOTAL | REDUCTION OF FRICTION LOSS |
| 1st DRIVING SPEED | | 0.765 | | 1.000 | 0.765 | 2.530 | 28% |
| 2nd DRIVING SPEED | 0.433 | | | 0.567 | 0.433 | 1.433 | 28% |
| 3rd DRIVING SPEED | 1.000 | 1.000 | | | | 2.000 | |
| 4th DRIVING SPEED | 1.000 | | 0.566 | | 0.433 | 1.999 | 40% |
| REVERSE | | 1.000 | 1.000 | 1.000 | | 3.000 | 30% |
| TOTAL | 2.433 | 2.765 | 1.566 | 2.567 | 1.631 | 10.962 | 28% |
| REDUCTION OF FRICTION LOSS | | | 57% | | 57% | 28% | |

TRANSMISSION WITH SIMPLE PLANETARY GEAR SETS

BACKGROUND OF THE INVENTION

1. Field of the Invention

The present invention relates to a transmission. More particularly, the present invention relates to a vehicle transmission including multiple planetary gear sets.

2. Description of Related Art

Transmissions are a conventional component in most, if not all, vehicles powered by internal combustion engines. Typical vehicle transmissions are either manual, automatic, or combined manual and automatic. While vehicles having manual transmissions are relatively simple and allow for significant driver control, vehicles equipped with automatic transmissions are relatively easy to drive because they do not require constant shifting and clutch control.

Most automatic transmissions include one or more gearing structures, known as planetary gear sets. Two of the most common types of planetary gear sets are simple single pinion planetary gear sets and simple double pinion planetary gear sets. FIG. 1 shows a schematic front view of a simple single pinion planetary gear set, and FIG. 2 shows a schematic front view of a simple dual pinion planetary gear set.

As shown in FIG. 1, the single pinion planetary gear set has three different elements including sun gear 10, carrier 12, and ring gear 14. A single set of pinion gears 16 are mounted for rotation on carrier 12 at a common radial distance from sun gear 10. Pinion gears 16 have outer gear teeth engaging both outer gear teeth on sun gear 10 and inner gear teeth on ring gear 14. Rotational motion input to either sun gear 10, carrier 12, or ring gear 14 causes relative rotation of each of these elements, and the resulting rotation of the elements provides output for the gear set. Selection of the particular number of gear teeth or diameters for sun gear 10, carrier 12, and ring gear 14, and optional braking of sun gear 10, carrier 12, or ring gear 14, determines the relative rotational velocities of sun gear 10, carrier 12 and ring gear 14 to allow for output of a variety of different rotational speeds and/or directions.

As shown in FIG. 2, the dual pinion planetary gear set is similar to the single pinion gear set, but includes a set of inner pinion gears 18 mounted for rotation on carrier 12 at a common radial distance from sun gear 10 and a set of outer pinion gears 20 mounted for rotation on carrier 12 at a greater common distance from sun gear 10. Each inner pinion gear 18 has outer teeth engaging sun gear 10 and a respective one of outer pinion gears 20, while outer pinion gears 20 have outer teeth engaging both the outer teeth of inner pinion gears 18 and the inner teeth of ring gear 14. Operation of the dual pinion planetary gear set of FIG. 2 is similar to operation of the single pinion planetary gear set of FIG. 1—rotational motion is input to one of the sun gear 10, carrier 12, and ring gear 14, and the resulting rotational motion of these elements provides output.

To allow for a greater number of shifting speeds, designers have developed transmissions having multiple planetary gear sets. FIG. 3 shows a partial schematic side view of a prior art Ravigneaux transmission structure having four driving speeds and reverse. As shown in FIG. 3, this transmission includes input shaft 22 for input of rotational motion to the transmission, output shaft 24 for output of rotational motion from the transmission, simple double pinion planetary gear set 30, simple single pinion planetary gear set 40, first clutch 50, second clutch 52, third clutch 54, first brake 56, and second brake 58.

Gear set 30 includes sun gear 32, carrier 34, and ring gear 36, and gear set 40 includes sun gear 42, carrier 44 directly connected to carrier 34 of gear set 30, and ring gear 46 directly connected to ring gear 36 of gear set 30. First clutch 50, second clutch 52, and third clutch 54 selectively couple input shaft 22, respectively, to sun gear 32 of gear set 30, to carrier 34 of gear set 30 and carrier 44 of gear set 40, and to sun gear 42 of gear set 40. First brake 56 selectively brakes rotational motion of carrier 44 of gear set 40 and carrier 34 of gear set 30. Second brake 58 selectively brakes rotational motion of sun gear 42 of gear set 40. Output shaft 24 is connected directly to both ring gear 46 of second gear set 40 and ring gear 36 of first gear set 30.

A controller (not shown) simultaneously activates two of clutches 50, 52, and 54, or one of clutches 50, 52, and 54 and one of brakes 56 and 58 to change speeds (gear ratios) of the transmission shown in FIG. 3. In a first driving speed of the transmission shown in FIG. 3, the controller activates (engages) first clutch 50 and first brake 56 so that output shaft 24 rotates once for each 2.846 rotations of input shaft 22. In a second driving speed, the controller activates first clutch 50 and second brake 58 so that output shaft 24 rotates once for each 1.581 rotations of input shaft 22. In a third driving speed, the controller activates first clutch 50 and second clutch 52 so that output shaft 24 rotates once for each rotation of input shaft 22. In a fourth driving speed, the controller activates second clutch 52 and second brake 58 so that output shaft 24 rotates once for each 0.685 rotations of input shaft 22. In reverse, the controller activates third clutch 54 and first brake 56 so that output shaft 24 rotates once, in a direction opposite to that of output shaft 24 rotation in the first through fourth driving speeds, for each rotation of input shaft 22.

Transmissions including multiple planetary gear sets, such as the transmission shown in FIG. 3, have been installed in a number of different types of vehicles. However, some of these complex transmission structures have one or more drawbacks. For example, transmissions with more than one planetary gear set are sometimes noisy, large in size, and difficult to manufacture.

Drag loss or friction loss is another significant disadvantage of transmissions having a plurality of planetary gear sets. Friction loss reduces fuel economy and overall efficiency of a vehicle. This loss occurs when engagement surfaces of a deactivated clutch or brake come in contact with rotating components. For example, when the transmission of FIG. 3 is placed in the first driving speed, the second clutch 52, third clutch 54, and second brake 58 are deactivated and cause friction as transmission components rotate with respect to them.

FIG. 4 shows a table including the relative amounts of friction loss occurring at clutches 50, 52, and 54 and at brakes 56 and 58 for each of the gear ratios of the transmission shown in FIG. 3. FIG. 4 also shows the total relative amount of friction loss for each gear ratio of the transmission and for each clutch 50, 52, 54 and brake 56 and 58 of the transmission. The values shown in the table of FIG. 4 are directly proportional to power loss. As is shown by the table of FIG. 4, frictional power loss occurs in each speed and in reverse for the transmission shown in FIG. 3. If transmissions could be designed with a reduced loss in even one gear ratio or at even one clutch or brake, vehicles equipped with these transmissions would be more fuel efficient.

In light of the foregoing, there is a need in the art for an improved transmission.

SUMMARY OF THE INVENTION

Accordingly, the present invention is directed to a transmission that substantially obviates one or more of the limitations of the related art. In particular, the present invention is directed to an improved transmission having reduced friction loss. Preferably, the transmission of the invention is relatively quiet, compact, and easy to manufacture.

To achieve these and other advantages and in accordance with the purpose of the invention, as embodied and broadly described herein, the invention includes a transmission comprising a first simple planetary gear set having first, second, and third elements, the first element of the first gear set receiving rotational motion input to the transmission, and a second simple planetary gear set having first, second, and third elements, the first element of the second gear set outputting rotational motion from the transmission and the third element of the second gear set being connected to the third element of the first gear set. A first clutch selectively couples the second element of the first gear set to the second element of the second gear set. A second clutch selectively couples the first element of the first gear set to the second element of the second gear set. A third clutch selectively couples two elements selected from the group consisting of the first, second, and third elements of the first gear set and the third element of the second gear set. A first brake selectively brakes the second element of the second gear set, and a second brake selectively brakes the third element of the second gear set.

In another aspect, the elements of the first gear set include a sun gear, a first carrier, and a first ring gear, and the elements of the second gear set include a second sun gear, a second carrier, and a second ring gear.

In a further aspect, the first and second planetary gear sets are single pinion or double pinion.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
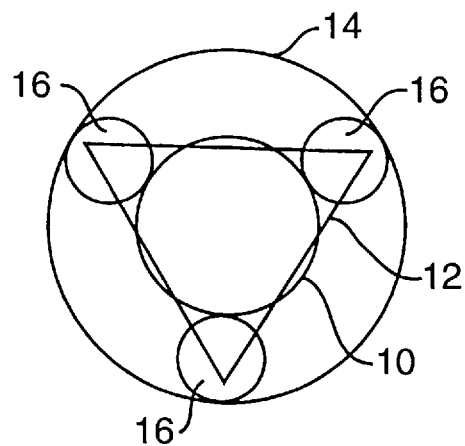
FIG. 1 is a schematic front view of a prior art, simple, single pinion planetary gear set.
Figure 2:
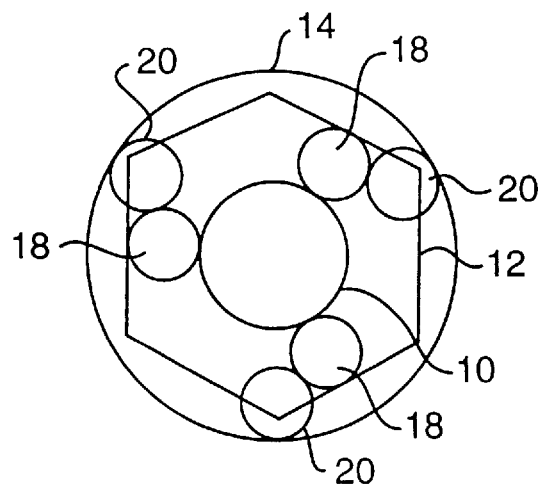
FIG. 2 is a schematic front view of a prior art, simple, double pinion planetary gear set.

Reference will now be made in detail to the present preferred embodiments of the invention, examples of which are illustrated in the accompanying drawings. Wherever possible, the same reference numbers are used in the drawings and the description to refer to the same or like parts. In addition, reference numerals having the same final two digits are used in the drawings and the description to refer to similar parts.

Figures 5, 6:
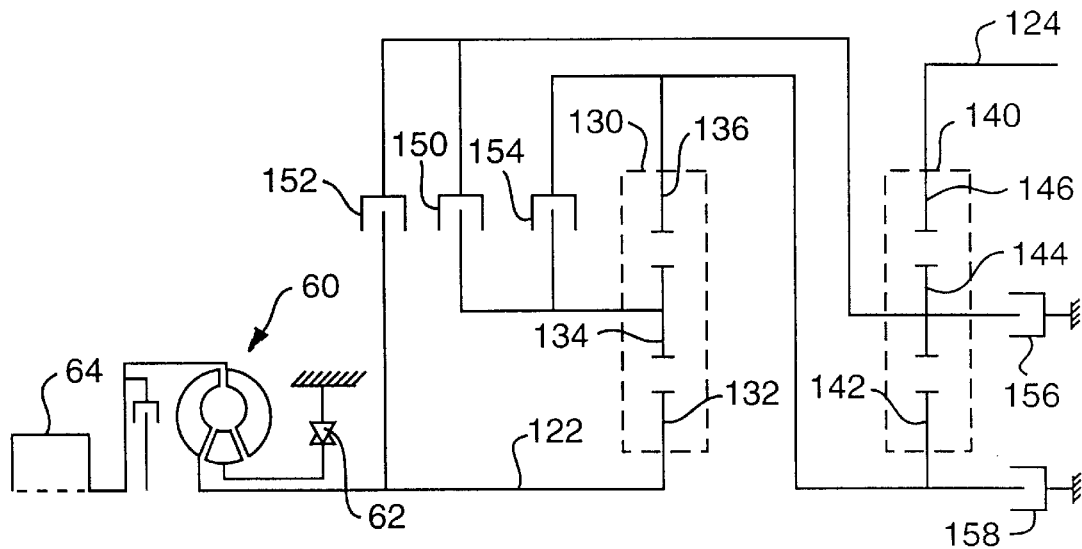
FIG. 5 is a partial schematic side view of an internal combustion engine, torque converter, one-way clutch, and first embodiment of the transmission of the invention.
FIG. 6 is a table showing the friction loss and reduction of friction loss for the transmission of FIG. 5.

In accordance with the invention, there is provided a first simple planetary gear set having first, second, and third elements, and a second planetary gear set having first second and third elements, the third element of the second gear set being connected to the third element of the first gear set. As shown in FIG. 5, a first embodiment of the invention includes first simple planetary gear set 130 and second simple planetary gear set 140. First gear set 130 is a single pinion gear set, and elements of first gear set 130 include first sun gear 132, first carrier 134, and first ring gear 136. Second gear set 140 is a single pinion gear set, and elements of second gear set 140 include second sun gear 142, second carrier 144, and second ring gear 146. As shown in FIG. 5, first ring gear 136 is directly connected to second sun gear 142. First sun gear 132 and first carrier 134 lack a direct connection to second sun gear 142, second carrier 144, and second ring gear 146.

Rotational motion is input to the transmission of FIG. 5 via input shaft 122 connected to first sun gear 132. When the transmission of FIG. 5 is used as an automatic transmission in an automobile, a torque converter 60 and one way clutch 62 transmit rotational motion from an internal combustion engine 64 to input shaft 122.

Rotational motion is output from the transmission of FIG. 5 via output shaft 124 connected to second ring gear 146. When the transmission of FIG. 5 is used in an automobile, output shaft 124 is connected to a drive train (not shown) for driving the drive wheels of an automobile.

In accordance with the invention, a first clutch selectively couples the second element of the first gear set to the second element of the second gear set, a second clutch selectively couples the first element of the first gear set to the second element of the second gear set, a third clutch selectively couples two elements selected from the group consisting of the first, second, and third elements of the first gear set and the third element of the second gear set, a first brake selectively brakes the second element of the second gear set, and a second brake selectively brakes the third element of the second gear set. As shown in FIG. 5, the transmission of the first embodiment also includes first clutch 150 selectively coupling first carrier 134 to second carrier 144, second clutch 152 selectively coupling first sun gear 132 to second carrier 144, third clutch 154 selectively coupling first carrier 134 to first ring gear 136, first brake 156 selectively braking rotational motion of second carrier 144, and second brake 158 selectively braking rotational motion of second sun gear 142.

To change speeds (gear ratios) of the transmission shown in FIG. 5, a control system (not shown) simultaneously activates (engages) two of clutches 150, 152, and 154, or one of clutches 150, 152, and 154 and one of brakes 156 and 158. In a first driving speed of the transmission shown in FIG. 5, the controller activates first clutch 150 and first brake 156 so that output shaft 124 rotates slower than input shaft 122. In a second driving speed, the control system activates first clutch 150 and second brake 158 so that output shaft 124 rotates slower than input shaft 122, but relatively faster than when the transmission is in the first driving speed.

In a third driving speed, the control system activates first clutch 150 and second clutch 152 so that output shaft 124 rotates once for each rotation of input shaft 122. In a fourth driving speed, the control system activates second clutch 152 and second brake 158 so that output shaft 124 rotates faster than input shaft 122. In reverse, the control system activates third clutch 154 and first brake 156 so that output shaft 124 rotates at a rate slower than input shaft 122 and in a direction opposite to that of output shaft 124 in the first through fourth driving speeds.

Figures 3, 4:
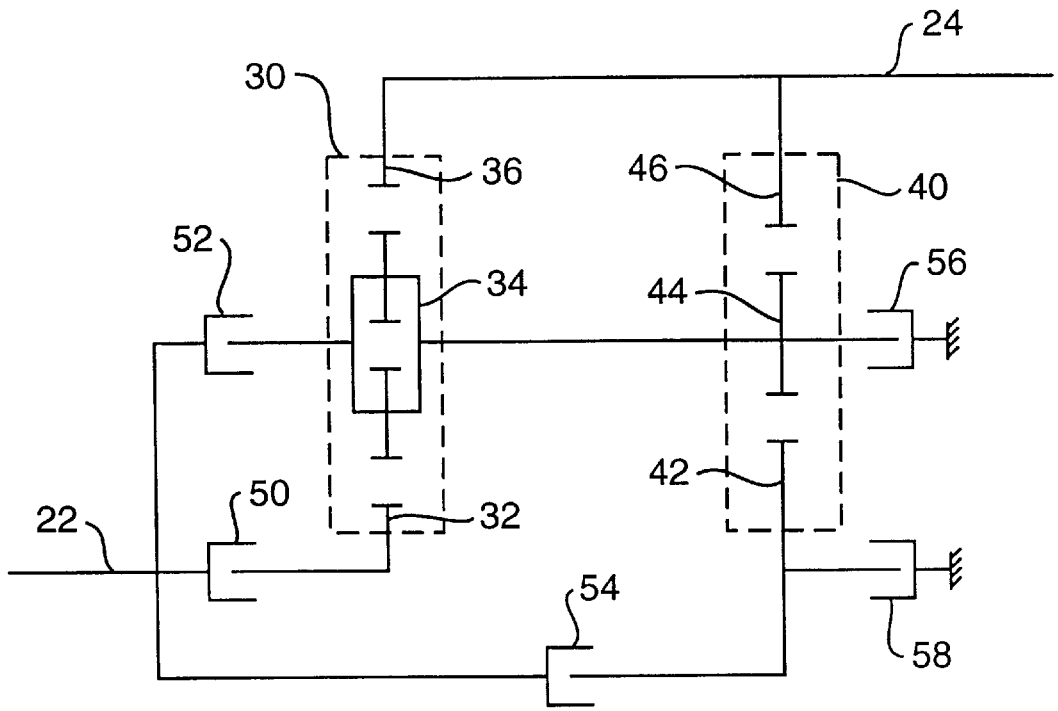
FIG. 3 is a partial schematic side view of a prior art Ravigneaux transmission structure having four driving speeds and reverse.
FIG. 4 is a table showing friction loss for the transmission of FIG. 3.

FIG. 6 is a table, similar to the table of FIG. 4, including the relative amounts of friction loss occurring at clutches 150, 152, and 154 and at brakes 156 and 158 for each of the gear ratios of the transmission shown in FIG. 5. FIG. 6 also shows the total relative amount of friction loss for each gear ratio of the transmission and for each clutch 150, 152, 154 and brake 156 and 158 of the transmission. In addition, the bottom row and right end column of the table include a comparison between the transmission shown in FIG. 5 and the prior art transmission shown in FIG. 3.

As compared to the prior art transmission of FIG. 3, and as shown in FIG. 6, the transmission of FIG. 5 has a 57% reduction in friction loss at first clutch 150, a 57% reduction in friction loss at third clutch 154, a 28% reduction of friction loss in the first driving speed, a 28% reduction of friction loss in the second driving speed, a 40% reduction of friction loss in the fourth driving speed, a 30% reduction of friction loss in reverse, and a 28% overall reduction of friction loss. When the transmission of FIG. 5 is installed in a vehicle, these reductions of friction loss significantly decrease the amount of power loss and improve vehicle fuel efficiency.

One possible reason for the reduced friction loss in the transmission of FIG. 5 is because deactivated clutches and brakes are not positioned adjacent to the fastest rotating components of the transmission.

Figures 7, 8:
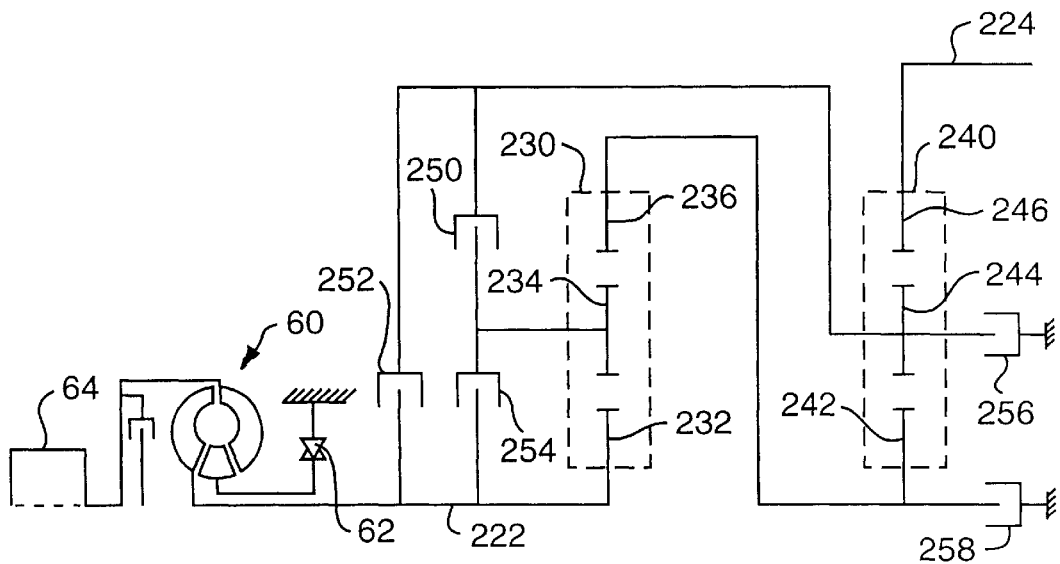
FIG. 7 is a partial schematic side view of an internal combustion engine, torque converter, one-way clutch, and second embodiment of the transmission of the invention.
FIG. 8 is a table showing the friction loss and reduction of friction loss for the transmission of FIG. 7.

FIG. 7 shows a second embodiment of the transmission of the invention. The transmission shown in FIG. 7 includes first simple planetary gear set 230 and second simple planetary gear set 240. First gear set 230 is a single pinion gear set, and elements of first gear set 230 include first sun gear 232, first carrier 234, and first ring gear 236. Second gear set 240 is a single pinion gear set, and elements of second gear set 240 include second sun gear 242, second carrier 244, and second ring gear 246. As shown in FIG. 7, first ring gear 236 is directly connected to second sun gear 242. First sun gear 232 and first carrier 234 lack a direct connection to second sun gear 242, second carrier 244, and second ring gear 246.

Rotational motion is input to the transmission of FIG. 7 via input shaft 222 connected to first sun gear 232. When the transmission of FIG. 7 is used as an automatic transmission in an automobile, a torque converter 60 and one way clutch 62 transmit rotational motion from an internal combustion engine 64 to the input shaft 222.

Rotational motion is output from the transmission of FIG. 7 via output shaft 224 connected to second ring gear 246. When the transmission of FIG. 7 is used in an automobile, output shaft 224 is connected to a drive train (not shown) for driving the drive wheels of an automobile.

As shown in FIG. 7, the transmission of the second embodiment also includes first clutch 250 selectively coupling first carrier 234 to second carrier 244, second clutch 252 selectively coupling first sun gear 232 to second carrier 244, third clutch 254 selectively coupling first sun gear 232 to first carrier 234, first brake 256 selectively braking rotational motion of second carrier 244, and second brake 258 selectively braking rotational motion of the second sun gear 242.

To change speeds (gear ratios) of the transmission shown in FIG. 7, a control system (not shown) simultaneously activates (engages) two of clutches 250, 252, and 254, or one of clutches 250, 252, and 254 and one of brakes 256 and 258 and 254 and both of brakes 256 and 258. In a first driving speed of the transmission shown in FIG. 7, the controller activates first clutch 250 and first brake 256 so that output shaft 224 rotates slower than input shaft 222. In a second driving speed, the control system activates first clutch 250 and second brake 258 so that output shaft 224 rotates slower than input shaft 222, but relatively faster than when the transmission is in the first driving speed.

In a third driving speed, the control system activates first clutch 250 and second clutch 252 so that output shaft 224 rotates once for each rotation of input shaft 222. In a fourth driving speed, the control system activates second clutch 252 and second brake 258 so that output shaft 224 rotates faster than input shaft 222. In reverse, the control system activates third clutch 254 and first brake 256 so that output shaft 224 rotates at a rate slower than input shaft 222 and in a direction opposite to that of output shaft 224 in the first through fourth driving speeds.

FIG. 8 is a table, similar to the table of FIG. 4, including the relative amounts of friction loss occurring at clutches 250, 252, and 254 and at brakes 256 and 258 for each of the gear ratios of the transmission shown in FIG. 7. FIG. 8 also shows the total relative amount of friction loss for each gear ratio of the transmission and for each clutch 250, 252, 254 and brake 256 and 258 of the transmission. In addition, the bottom row and right end column of the table include a comparison between the transmission shown in FIG. 7 and the prior art transmission shown in FIG. 3.

As compared to the prior art transmission of FIG. 3, and as shown in FIG. 8, the transmission of FIG. 7 has a 57% reduction in friction loss at first clutch 250, a 57% reduction in friction loss at third clutch 254, a 28% reduction of friction loss in the first driving speed, a 28% reduction of friction loss in the second driving speed, a 40% reduction of friction loss in the fourth driving speed, a 30% reduction of friction loss in reverse, and a 28% overall reduction of friction loss. When the transmission of FIG. 7 is installed in a vehicle, these reductions of friction loss decrease the amount of power loss, and improve vehicle fuel efficiency.

One possible reason for the decreased friction loss transmission of FIG. 7 is because deactivated clutches and brakes are not positioned adjacent to the fastest rotating components of the transmission.

Figures 9, 10:
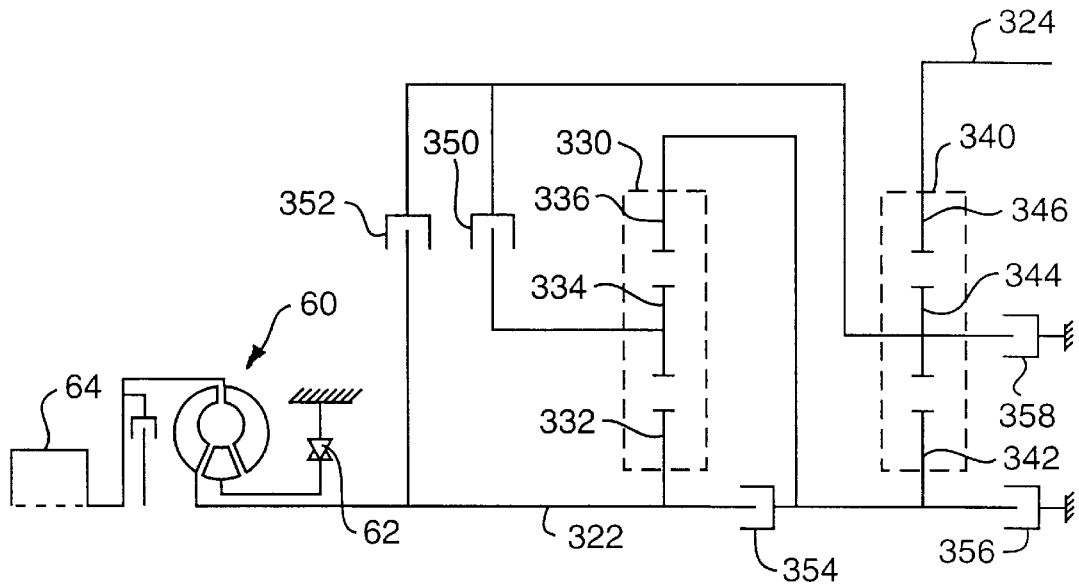
FIG. 9 is a partial schematic side view of an internal combustion engine, torque converter, one-way clutch, and third embodiment of the transmission of the invention.
FIG. 10 is a table showing the friction loss and reduction of friction loss for the transmission of FIG. 9.

FIG. 9 shows a third embodiment of the transmission of the invention. The transmission shown in FIG. 9 includes first simple planetary gear set 330 and second simple planetary gear set 340. First gear set 330 is a single pinion gear set, and elements of first gear set 330 include first sun gear 332, first carrier 334, and first ring gear 336. Second gear set 340 is a single pinion gear set, and elements of second gear set 340 include second sun gear 342, second carrier 344, and second ring gear 346. As shown in FIG. 9, first ring gear 336 is directly connected to second sun gear 342. First sun gear 332 and first carrier 334 lack a direct connection to second sun gear 342, second carrier 344, and second ring gear 346.

Rotational motion is input to the transmission of FIG. 9 via input shaft 322 connected to first sun gear 332. When the transmission of FIG. 9 is used as an automatic transmission in an automobile, a torque converter 60 and one way clutch 62 transmit rotational motion from an internal combustion engine 64 to the input shaft 322.

Rotational motion is output from the transmission of FIG. 9 via output shaft 324 connected to second ring gear 346. When the transmission of FIG. 9 is used in an automobile, output shaft 324 is connected to a drive train (not shown) for driving the drive wheels of an automobile.

As shown in FIG. 9, the transmission of the third embodiment also includes first clutch 350 selectively coupling first carrier 334 to second carrier 344, second clutch 352 selectively coupling first sun gear 332 to second carrier 344, third clutch 354 selectively coupling first sun gear 332 to second sun gear 342, first brake 356 selectively braking rotational motion of second sun gear 342, and second brake 358 selectively braking rotational motion of the second carrier 344.

To change speeds (gear ratios) of the transmission shown in FIG. 9, a control system (not shown) simultaneously activates (engages) two of clutches 350, 352, and 354, or one of clutches 350, 352, and 354 and one of brakes 356 and 358. In a first driving speed of the transmission shown in FIG. 9, the controller activates first clutch 350 and first brake 356 so that output shaft 324 rotates slower than input shaft 322. In a second driving speed, the control system activates first clutch 350 and second brake 358 so that output shaft 324 rotates slower than input shaft 322, but relatively faster than when the transmission is in the first driving speed.

In a third driving speed, the control system activates first clutch 350 and second clutch 352 so that output shaft 324 rotates once for each rotation of input shaft 322. In a fourth driving speed, the control system activates second clutch 352 and second brake 358 so that output shaft 324 rotates faster than input shaft 322. In reverse, the control system activates third clutch 354 and first brake 356 so that output shaft 324 rotates at a rate slower than input shaft 322 and in a direction opposite to that of output shaft 324 in the first through fourth driving speeds.

FIG. 10 is a table, similar to the table of FIG. 4, including the relative amounts of friction loss occurring at clutches 350, 352, and 354 and at brakes 356 and 358 for each of the gear ratios of the transmission shown in FIG. 9. FIG. 10 also shows the total relative amount of friction loss for each gear ratio of the transmission and for each clutch 350, 352, 354 and brake 356 and 358 of the transmission. In addition, the bottom row and right end column of the table include a comparison between the transmission shown in FIG. 9 and the prior art transmission shown in FIG. 3.

As compared to the prior art transmission of FIG. 3, and as shown in FIG. 10, the transmission of FIG. 9 has a 57% reduction in friction loss at first clutch 350, a 22% reduction of friction loss in the fourth driving speed, a 30% reduction of friction loss in reverse, and a 14% overall reduction of friction loss. When the transmission of FIG. 9 is installed in a vehicle, these reductions of friction loss decrease the amount of power loss and improve vehicle fuel efficiency.

One reason for the decreased friction loss in the transmission of FIG. 9 is because deactivated clutches and brakes are not positioned adjacent to the fastest rotating components of the transmission.

Figures 11, 12:
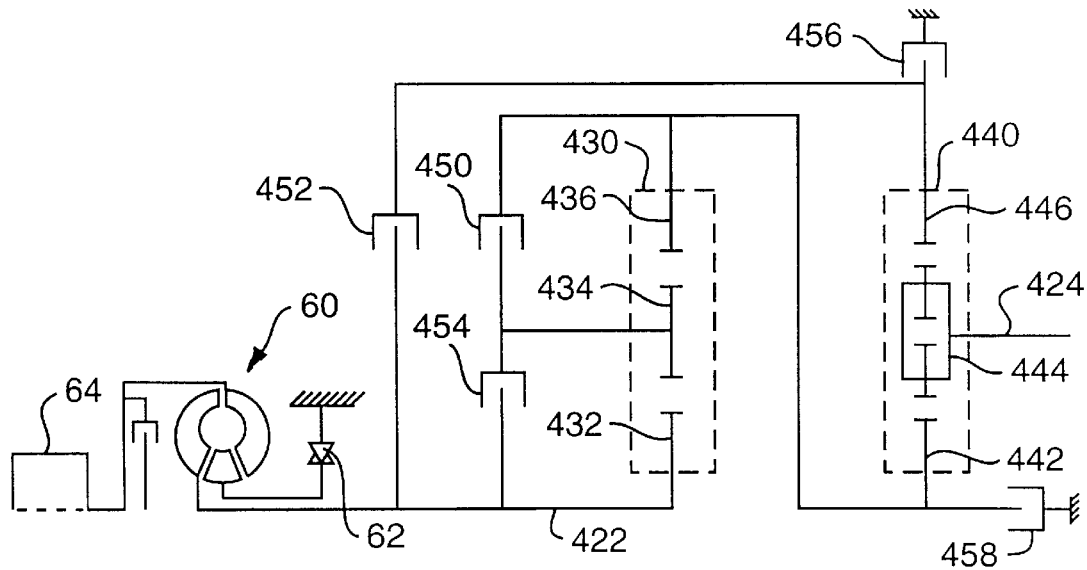
FIG. 11 is a partial schematic side view of an internal combustion engine, torque converter, one-way clutch, and fourth embodiment of the transmission of the invention.
FIG. 12 is a table showing the friction loss and reduction of friction loss for the transmission of FIG. 11.

FIG. 11 shows a fourth embodiment of the transmission of the invention. The transmission shown in FIG. 11 includes first simple planetary gear set 430 and second simple planetary gear set 440. First gear set 430 is a single pinion gear set, and elements of first gear set 430 include first sun gear 432, first carrier 434, and first ring gear 436. Second gear set 440 is a double pinion gear set, and elements of second gear set 440 include second sun gear 442, second carrier 444, and second ring gear 446. As shown in FIG. 11, first ring gear 436 is directly connected to second sun gear 432. First sun gear 432 and first carrier 434 lack a direct connection to second sun gear 442, second carrier 444, and second ring gear 446.

Rotational motion is input to the transmission of FIG. 11 via input shaft 422 connected to first sun gear 432. When the transmission of FIG. 11 is used as an automatic transmission in an automobile, a torque converter 60 and one way clutch 62 transmit rotational motion from an internal combustion engine 64 to the input shaft 422.

Rotational motion is output from the transmission of FIG. 11 via output shaft 424 connected to second carrier 444. When the transmission of FIG. 11 is used in an automobile, output shaft 424 is connected to a drive train (not shown) for driving the drive wheels of an automobile.

As shown in FIG. 11, the transmission of the fourth embodiment also includes first clutch 450 selectively coupling first carrier 434 to second ring gear 446, second clutch 452 selectively coupling first sun gear 432 to second ring gear 436, third clutch 454 selectively coupling first carrier 434 to first sun gear 432, first brake 456 selectively braking rotational motion of second ring gear 446, and second brake 458 selectively braking rotational motion of the second sun gear 442.

To change speeds (gear ratios) of the transmission shown in FIG. 11, a control system (not shown) simultaneously activates (engages) two of clutches 450, 452, and 454, or one of clutches 450, 452, and 454 and one of brakes 456 and 458. In a first driving speed of the transmission shown in FIG. 11, the controller activates first clutch 450 and first brake 456 so that output shaft 424 rotates slower than input shaft 422. In a second driving speed, the control system activates first clutch 450 and second brake 458 so that output shaft 424 rotates slower than input shaft 422, but relatively faster than when the transmission is in the first driving speed.

In a third driving speed, the control system activates first clutch 450 and second clutch 452 so that output shaft 424 rotates once for each rotation of input shaft 422. In a fourth driving speed, the control system activates second clutch 450 and second brake 458 so that output shaft 424 rotates faster than input shaft 422. In reverse, the control system activates third clutch 454 and first brake 456 so that output shaft 424 rotates at a rate slower than input shaft 422 and in a direction opposite to that of output shaft 424 in the first through fourth driving speeds.

FIG. 12 is a table, similar to the table of FIG. 4, including the relative amounts of friction loss occurring at clutches 450, 452, and 454 and at brakes 456 and 458 for each of the gear ratios of the transmission shown in FIG. 11. FIG. 12 also shows the total relative amount of friction loss for each gear ratio of the transmission and for each clutch 450, 452, 254 and brake 456 and 458 of the transmission. In addition, the bottom row and right end column of the table include a comparison between the transmission shown FIG. 11 and the prior art transmission shown in FIG. 3.

As compared to the prior art transmission of FIG. 3, and as shown in FIG. 12, the transmission of FIG. 11 has a 57% reduction in friction loss at first clutch 450, a 43% reduction in friction loss at third clutch 454, a 22% reduction of friction loss in the first driving speed, a 22% reduction of friction loss in the second driving speed, a 36% reduction of friction loss in the fourth driving speed, a 30% reduction of friction loss in reverse, and a 24% overall reduction of friction loss. When the transmission of FIG. 11 is installed in a vehicle, these reductions of friction loss decrease the amount of power loss, and improve vehicle fuel efficiency.

One reason for the reduced friction loss may also be reduced in the transmission of FIG. 11 is because deactivated clutches and brakes are not positioned adjacent to the fastest rotating components of the transmission.

Figures 13, 14:
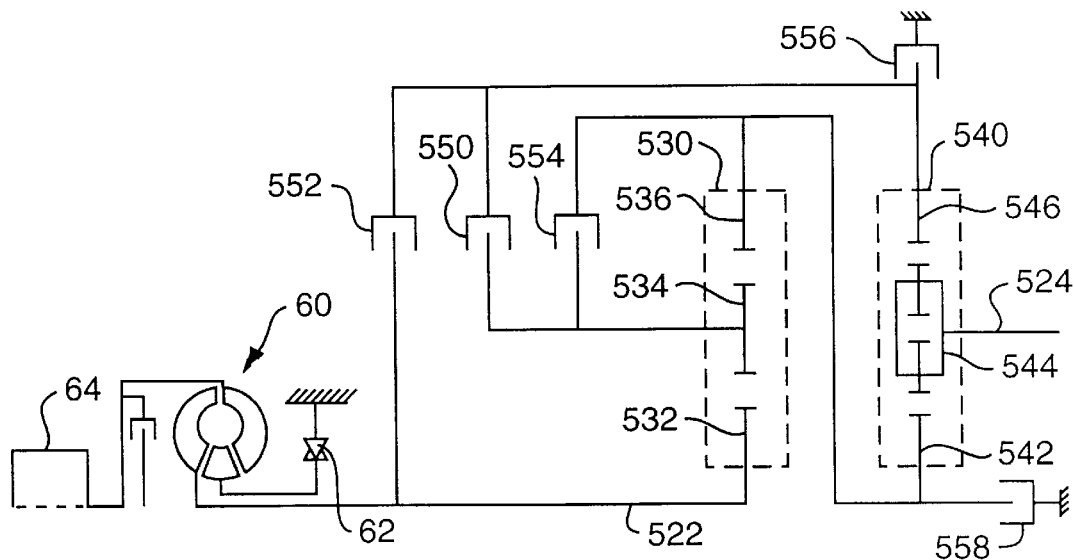
FIG. 13 is a partial schematic side view of an internal combustion engine, torque converter, one-way clutch, and fifth embodiment of the transmission of the invention.
FIG. 14 is a table showing the friction loss and reduction of friction loss for the transmission of FIG. 13.

FIG. 13 shows a fifth embodiment of the transmission of the invention. The transmission shown in FIG. 13 includes first simple planetary gear set 530 and second simple planetary gear set 540. First gear set 530 is a single pinion gear set, and elements of first gear set 530 include first sun gear 532, first carrier 534, and first ring gear 536. Second gear set 540 is a double pinion gear set, and elements of second gear set 540 include second sun gear 542, second carrier 544, and second ring gear 546. As shown in FIG. 13, first ring gear 536 is directly connected to second sun gear 542. First sun gear 532 and first carrier 534 lack a direct connection to second sun gear 542, second carrier 544, and second ring gear 256.

Rotational motion is input to the transmission of FIG. 13 via input shaft 522 connected to first sun gear 532. When the transmission of FIG. 13 is used as an automatic transmission in an automobile, a torque converter 60 and one way clutch 62 transmit rotational motion from an internal combustion engine 64 to the input shaft 522.

Rotational motion is output from the transmission of FIG. 13 via output shaft 524 connected to second carrier 544. When the transmission of FIG. 13 is used in an automobile, output shaft 524 is connected to a drive train (not shown) for driving the drive wheels of an automobile.

As shown in FIG. 13, the transmission of the fifth embodiment also includes first clutch 550 selectively coupling first carrier 534 to second ring gear 546, second clutch 552 selectively coupling first sun gear 532 to second ring gear 546, third clutch 554 selectively coupling first ring gear 536 to first carrier 534, first brake 556 selectively braking rotational motion of second ring gear 546, and second brake 558 selectively braking rotational motion of the second sun gear 542.

To change speeds (gear ratios) of the transmission shown in FIG. 13, a control system (not shown) simultaneously activates (engages) two of clutches 550, 552, and 554, or one of clutches 550, 552, and 554 and one of brakes 556 and 558. In a first driving speed of the transmission shown in FIG. 13, the controller activates first clutch 550 and first brake 556 so that output shaft 524 rotates slower than input shaft 522. In a second driving speed, the control system activates first clutch 550 and second brake 558 so that output shaft 524 rotates slower than input shaft 522, but relatively faster than when the transmission is in the first driving speed.

In a third driving speed, the control system activates first clutch 550 and second clutch 552 so that output shaft 524 rotates once for each rotation of input shaft 522. In a fourth driving speed, the control system activates second clutch 552 and second brake 558 so that output shaft 524 rotates faster than input shaft 522. In reverse, the control system activates third clutch 554 and first brake 556 so that output shaft 524 rotates at a rate slower than input shaft 522 and in a direction opposite to that of output shaft 524 in the first through fourth driving speeds.

FIG. 14 is a table, similar to the table of FIG. 4, including the relative amounts of friction loss occurring at clutches 550, 552, and 554 and at brakes 556 and 558 for each of the gear ratios of the transmission shown in FIG. 13. FIG. 14 also shows the total relative amount of friction loss for each gear ratio of the transmission and for each clutch 550, 552, 554 and brake 556 and 558 of the transmission. In addition, the bottom row and right end column of the table include a comparison between the transmission shown in FIG. 13 and the prior art transmission shown in FIG. 3.

As compared to the prior art transmission of FIG. 3, and as shown in FIG. 14, the transmission of FIG. 13 has a 57% reduction in friction loss at first clutch 550, a 57% reduction in friction loss at third clutch 554, a 28% reduction of friction loss in the first driving speed, a 28% reduction of friction loss in the second driving speed, a 40% reduction of friction loss in the fourth driving speed, a 30% reduction of friction loss in reverse, and a 28% overall reduction of friction loss. When the transmission of FIG. 13 is installed in a vehicle, these reductions of friction loss decrease the amount of power loss and improve vehicle fuel efficiency.

One possible reason for the decreased friction loss may also be reduced in the transmission of FIG. 13 is because deactivated clutches and brakes are not positioned adjacent to the fastest rotating components of the transmission.

Figures 15, 16:
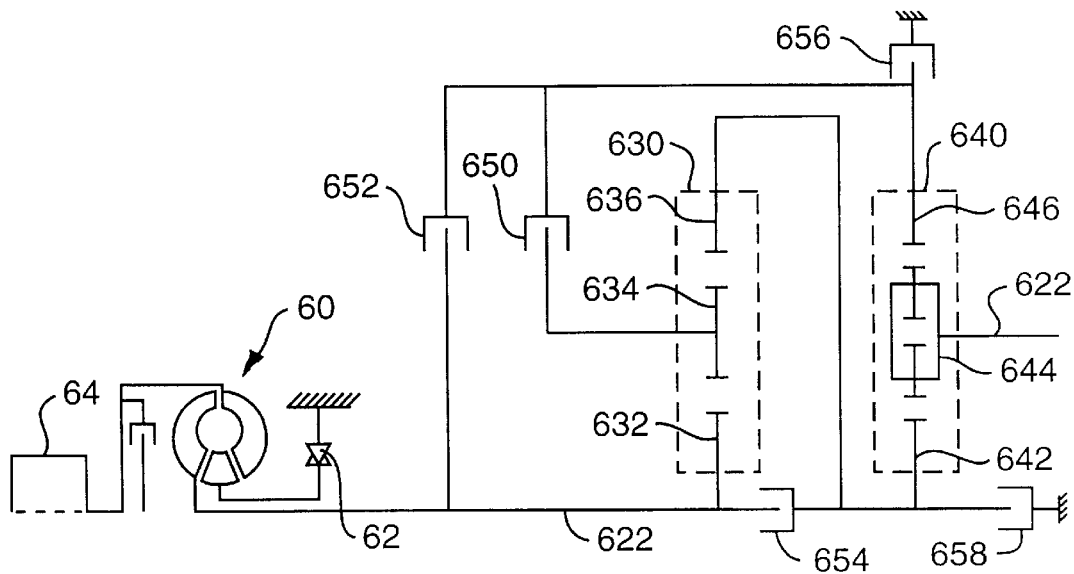
FIG. 15 is a partial schematic side view of an internal combustion engine, torque converter, one-way clutch, and sixth embodiment of the transmission of the invention.
FIG. 16 is a table showing the friction loss and reduction of friction loss for the transmission of FIG. 15.

FIG. 15 shows a sixth embodiment of the transmission of the invention. The transmission shown in FIG. 15 includes first simple planetary gear set 630 and second simple planetary gear set 640. First gear set 630 is a single pinion gear set, and elements of first gear set 630 include first sun gear 632, first carrier 634, and first ring gear 636. Second gear set 640 is a double pinion gear set, and elements of second gear set 640 include second sun gear 642, second carrier 644, and second ring gear 646. As shown in FIG. 15, first ring gear 636 is directly connected to second sun gear 642. First sun gear 632 and first carrier 634 lack a direct connection to second sun gear 642, second carrier 644, and second ring gear 646.

Rotational motion is input to the transmission of FIG. 15 via input shaft 622 connected to first sun gear 632. When the transmission of FIG. 15 is used as an automatic transmission in an automobile, a torque converter 60 and one way clutch 62 transmit rotational motion from an internal combustion engine 64 to the input shaft 622.

Rotational motion is output from the transmission of FIG. 15 via output shaft 624 connected to second carrier 644. When the transmission of FIG. 15 is used in an automobile, output shaft 624 is connected to a drive train (not shown) for driving the drive wheels of an automobile.

As shown in FIG. 15, the transmission of the sixth embodiment also includes first clutch 650 selectively coupling first carrier 634 to second ring gear 646, second clutch 652 selectively coupling first sun gear 632 to second ring gear 646, third clutch 654 selectively coupling first sun gear 632 to second sun gear 642, first brake 656 selectively braking rotational motion of second ring gear 646, and second brake 658 selectively braking rotational motion of the second sun gear 642.

To change speeds (gear ratios) of the transmission shown in FIG. 15, a control system (not shown) simultaneously activates (engages) two of clutches 650, 652, and 654, or one of clutches 650, 652, and 654 and one of brakes 656 and 658. In a first driving speed of the transmission shown in FIG. 15, the controller activates first clutch 650 and first brake 656 so that output shaft 624 rotates slower than input shaft 622. In a second driving speed, the control system activates first clutch 650 and second brake 658 so that output shaft 624 rotates slower than input shaft 622, but relatively faster than when the transmission is in the first driving speed.

In a third driving speed, the control system activates first clutch 650 and second clutch 652 so that output shaft 624 rotates once for each rotation of input shaft 622. In a fourth driving speed, the control system activates second clutch 652 and second brake 658 so that output shaft 624 rotates faster than input shaft 622. In reverse, the control system activates third clutch 654 and first brake 656 so that output shaft 624 rotates at a rate slower than input shaft 622 and in a direction opposite to that of output shaft 624 in the first through fourth driving speeds.

FIG. 16 is a table, similar to the table of FIG. 4, including the relative amounts of friction loss occurring at clutches 650, 652, and 654 and at brakes 656 and 658 for each of the gear ratios of the transmission shown in FIG. 15. FIG. 16 also shows the total relative amount of friction loss for each gear ratio of the transmission and for each clutch 650, 652, 654 and brake 656 and 658 of the transmission. In addition, the bottom row and right end column of the table include a comparison between the transmission shown in FIG. 15 and the prior art transmission shown in FIG. 3.

As compared to the prior art transmission of FIG. 3, and as shown in FIG. 16, the transmission of FIG. 15 has a 57% reduction in friction loss at first clutch 650, a 22% reduction of friction loss in the fourth driving speed, a 30% reduction of friction loss in reverse, and a 14% overall reduction of friction loss. When the transmission of FIG. 15 is installed in a vehicle, these reductions of friction loss decrease the amount of power loss and improve vehicle fuel efficiency.

One possible reason for the reduced friction loss in the transmission of FIG. 15 is because deactivated clutches and brakes are not positioned adjacent to the fastest rotating components of the transmission.

Figures 17, 18:
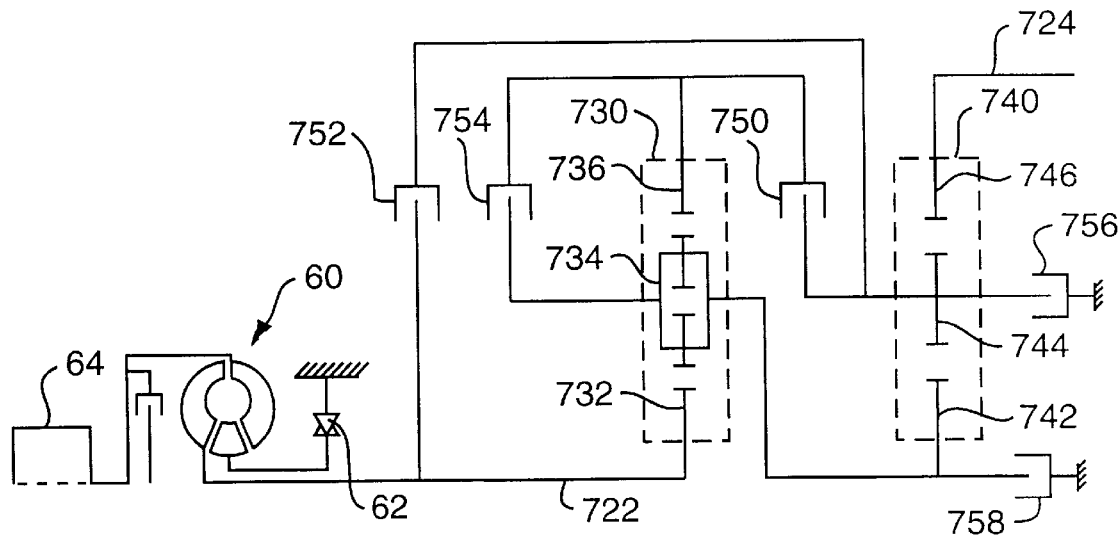
FIG. 17 is a partial schematic side view of an internal combustion engine, torque converter, one-way clutch, and seventh embodiment of the transmission of the invention.
FIG. 18 is a table showing the friction loss and reduction of friction loss for the transmission of FIG. 17.

FIG. 17 shows a seventh embodiment of the transmission of the invention. The transmission shown in FIG. 17 includes first simple planetary gear set 730 and second simple planetary gear set 740. First gear set 730 is a double pinion gear set, and elements of first gear set 730 include first sun gear 732, first carrier 734, and first ring gear 736. Second gear set 740 is a single pinion gear set, and elements of second gear set 740 include second sun gear 742, second carrier 744, and second ring gear 746. A shown in FIG. 17, first carrier 734 is directly connected to second sun gear 742. First sun gear 732 and first ring gear 736 lack a direct connection to second sun gear 742, second carrier 744, and second ring gear 746.

Rotational motion is input to the transmission of FIG. 17 via input shaft 722 connected to first sun gear 732. When the transmission of FIG. 17 is used as an automatic transmission in an automobile, a torque converter 60 and one way clutch 62 transmit rotational motion from an internal combustion engine 64 to the input shaft 722.

Rotational motion is output from the transmission of FIG. 17 via output shaft 724 connected to second ring gear 746. When the transmission of FIG. 17 is used in an automobile, output shaft 724 is connected to a drive train (not shown) for driving the drive wheels of an automobile.

As shown in FIG. 17, the transmission of the seventh embodiment also includes first clutch 750 selectively coupling first ring gear 736 to second carrier 744, second clutch 752 selectively coupling first sun gear 732 to second carrier 744, third clutch 754 selectively coupling first carrier 734 to first ring gear 736, first brake 756 selectively braking rotational motion of second carrier 744, and second brake 758 selectively braking rotational motion of second sun gear 742.

To change speeds (gear ratios) of the transmission shown in FIG. 17, a control system (not shown) simultaneously activates (engages) two of clutches 750, 752, and 754, or one of clutches 750, 752, and 754 and one of brakes 756 and 758. In a first driving speed of the transmission shown in FIG. 17, the controller activates first clutch 750 and first brake 756 so that output shaft 724 rotates slower than input shaft 722. In a second driving speed, the control system activates first clutch 750 and second brake 758 so that output shaft 724 rotates slower than input shaft 722, but relatively faster than when the transmission is in the first driving speed.

In a third driving speed, the control system activates first clutch 750 and second clutch 752 so that output shaft 724 rotates once for each rotation of input shaft 722. In a fourth driving speed, the control system activates second clutch 752 and second brake 758 so that output shaft 724 rotates faster than input shaft 722. In reverse, the control system activates third clutch 754 and first brake 756 so that output shaft 724 rotates at a rate slower than input shaft 722 and in a direction opposite to that of output shaft 724 in the first through fourth driving speeds.

FIG. 18 is a table, similar to the table of FIG. 4, including the relative amounts of friction loss occurring at clutches 750, 752, and 754 and at brakes 756 and 758 for each of the gear ratios of the transmission shown in FIG. 17. FIG. 18 also shows the total relative amount of friction loss for each gear ratio of the transmission and for each clutch 750, 752, 754 and brake 756 and 758 of the transmission. In addition, the bottom row and right end column of the table include a comparison between the transmission shown in FIG. 17 and the prior art transmission shown in FIG. 3.

As compared to the prior art transmission of FIG. 3, and as shown in FIG. 18, the transmission of FIG. 17 has a 57% reduction in friction loss at first clutch 750, a 57% reduction in friction loss at third clutch 754, a 28% reduction of friction loss in the first driving speed, a 28% reduction of friction loss in the second driving speed, a 40% reduction of friction loss in the fourth driving speed, a 30% reduction of friction loss in reverse, and a 28% overall reduction of friction loss. When the transmission of FIG. 17 is installed in a vehicle, these reductions of friction loss decrease the amount of power loss and improve vehicle fuel efficiency.

One possible reason for the reduced friction loss in the transmission of FIG. 17 is because deactivated clutches and brakes are not positioned adjacent to the fastest rotating components of the transmission.

Figures 19, 20:
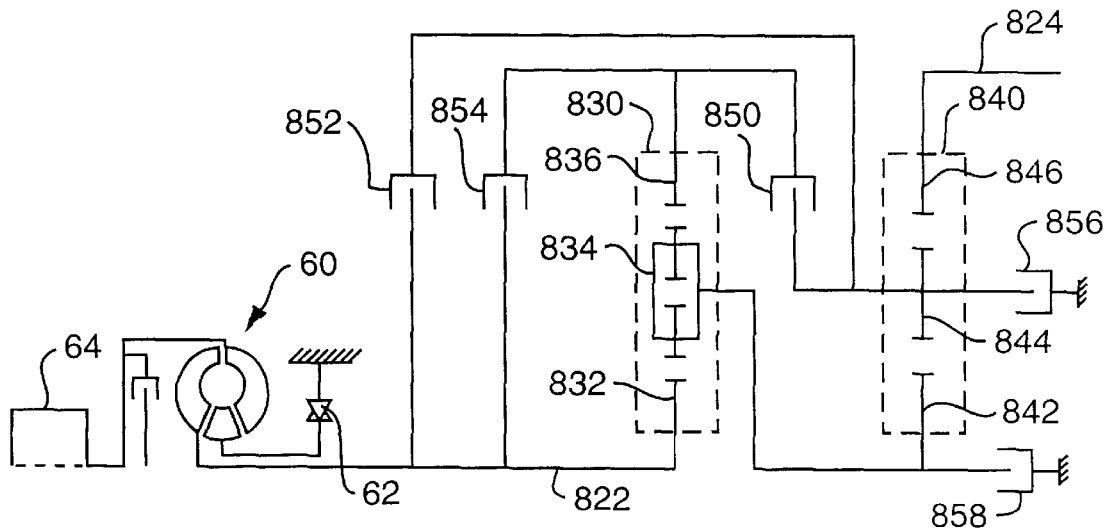
FIG. 19 is a partial schematic side view of an internal combustion engine, torque converter, one-way clutch, and eighth embodiment of the transmission of the invention.
FIG. 20 is a table showing the friction loss and reduction of friction loss for the transmission of FIG. 19.

FIG. 19 shows an eighth embodiment of the transmission of the invention. The transmission shown in FIG. 19 includes first simple planetary gear set 830 and second simple planetary gear set 840. First gear set 830 is a double pinion gear set, and elements of first gear set 830 include first sun gear 832, first carrier 834, and first ring gear 836. Second gear set 840 is a single pinion gear set, and elements of second gear, set 840 include second sun gear 842, second carrier 844, and second ring gear 846. As shown in FIG. 5, first carrier 834 is directly connected to second sun gear 842. First sun gear 832 and first ring gear 836 lack a direct connection to second sun gear 842, second carrier 844, and second ring gear 846.

Rotational motion is input to the transmission of FIG. 19 via input shaft 822 connected to first sun gear 832. When the transmission of FIG. 19 is used as an automatic transmission in an automobile, a torque converter 60 and one way clutch 62 transmit rotational motion from an internal combustion engine 64 to the input shaft 822.

Rotational motion is output from the transmission of FIG. 19 via output shaft 824 connected to second ring gear 846. When the transmission of FIG. 19 is used in an automobile, output shaft 824 is connected to a drive train (not shown) for driving the drive wheels of an automobile.

As shown in FIG. 19, the transmission of the eighth embodiment also includes first clutch 850 selectively coupling first ring gear 836 to second carrier 844, second clutch 852 selectively coupling first sun gear 832 to second carrier 844, third clutch 854 selectively coupling first sun gear 832 to first ring gear 836, first brake 856 selectively braking rotational motion of second carrier 844, and second brake 858 selectively braking rotational motion of the second sun gear 842.

To change speeds (gear ratios) of the transmission shown in FIG. 19, a control system (not shown) simultaneously activates (engages) two of clutches 850, 852, and 854, or one of clutches 850, 852, and 854 and one of brakes 856 and 858. In a first driving speed of the transmission shown in FIG. 19, the controller activates first clutch 850 and first brake 856 so that output shaft 824 rotates slower than input shaft 822. In at second driving speed, the control system activates first clutch 850 and second brake 858 so that output shaft 824 rotates slower than input shaft 822, but relatively faster than when the transmission is in the first driving speed.

In a third driving speed, the control system activates first clutch 850 and second clutch 852 so that output shaft 824 rotates once for each rotation of input shaft 822. In a fourth driving speed, the control system activates second clutch 852 and second brake 858 so that output shaft 824 rotates faster than input shaft 822. In reverse, the control system activates third clutch 854 and first brake 856 so that output shaft 824 rotates at a rate slower than input shaft 822 and in a direction opposite to that of output shaft 824 in the first through fourth driving speeds.

FIG. 20 is a table, similar to the table of FIG. 4, including the relative amounts of friction loss occurring at clutches 850, 852, and 854 and at brakes 856 and 858 for each of the gear ratios of the transmission shown in FIG. 19. FIG. 20 also shows the total relative amount of friction loss for each gear ratio of the transmission and for each clutch 850, 852, 854 and brake 856 and 858 of the transmission. In addition, the bottom row and right end column of the table include a comparison between the transmission shown in FIG. 19 and the prior art transmission shown in FIG. 3.

As compared to the prior art transmission of FIG. 3, and as shown in FIG. 20, the transmission of FIG. 19 has a 57% reduction in friction loss at first clutch 850, a 43% reduction in friction loss at third clutch 854, a 22% reduction of friction loss in the first driving speed, a 22% reduction of friction loss in the second driving speed, a 36% reduction of friction loss in the fourth driving speed, a 30% reduction of friction loss in reverse, and a 24% overall reduction of friction loss. When the transmission of FIG. 19 is installed in a vehicle, these reductions of friction loss decrease the amount of power loss and improve vehicle fuel efficiency.

One possible reason for the reduced friction loss in the transmission of FIG. 19 is because deactivated clutches and brakes are not positioned adjacent to the fastest rotating components of the transmission.

Figures 21, 22:
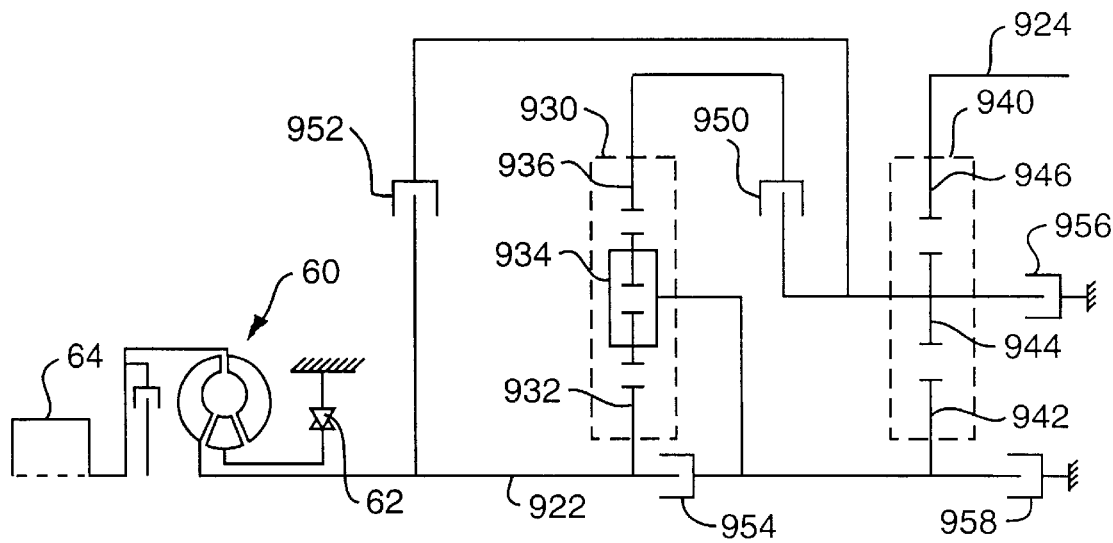
FIG. 21 is a partial schematic side view of an internal combustion engine, torque converter, one-way clutch, and ninth embodiment of the transmission of the invention.
FIG. 22 is a table showing the friction loss and reduction of friction loss for the transmission of FIG. 21.

FIG. 21 shows a ninth embodiment of the transmission of the invention. The transmission shown in FIG. 21 includes first simple planetary gear set 930 and second simple planetary gear set 940. First gear set 930 is a double pinion gear set, and elements of first gear set 930 include first sun gear 932, first carrier 934, and first ring gear 936. Second gear set 940 is a single pinion gear set, and elements of second gear set 240 include second sun gear 942, second carrier 944, and second ring gear 946. As shown in FIG. 21, first carrier 934 is directly connected to second sun gear 942. First sun gear 932 and first ring gear 936 lack a direct connection to second sun gear 942, second carrier 944, and second ring gear 946.

Rotational motion is input to the transmission of FIG. 21 via input shaft 922 connected to first sun gear 932. When the transmission of FIG. 21 is used as an automatic transmission in an automobile, a torque converter 60 and one way clutch 62 transmit rotational motion from an internal combustion engine 64 to the input shaft 922.

Rotational motion is output from the transmission of FIG. 21 via output shaft 924 connected to second ring gear 946. When the transmission of FIG. 21 is used in an automobile, output shaft 924 is connected to a drive train (not shown) for driving the drive wheels of an automobile.

As shown in FIG. 21, the transmission of the ninth embodiment also includes first clutch 950 selectively coupling first ring gear 936 to second carrier 944, second clutch 952 selectively coupling first sun gear 932 to second carrier 944, third clutch 954 selectively coupling first sun gear 932 to second sun gear 942, first brake 256 selectively braking rotational motion of second carrier 944, and second brake 958 selectively braking rotational motion of the second sun gear 942.

To change speeds (gear ratios) of the transmission shown in FIG. 21, a control system (not shown) simultaneously activates (engages) two of clutches 950, 952, and 954, or one of clutches 950, 952, and 954 and one of brakes 956 and 958. In a first driving speed of the transmission shown in FIG. 19, the controller activates first clutch 950 and first brake 956 so that output shaft 924 rotates slower than input shaft 922. In a second driving speed, the control system activates first clutch 950 and second brake 958 so that output shaft 924 rotates slower than input shaft 922, but relatively faster than when the transmission is in the first driving speed.

In a third driving speed, the control system activates first clutch 950 and second clutch 952 so that output shaft 924 rotates once for each rotation of input shaft 922. In a fourth driving speed, the control system activates second clutch 952 and second brake 958 so that output shaft 924 rotates faster than input shaft 922. In reverse, the control system activates third clutch 954 and first brake 956 so that output shaft 924 rotates at a rate slower than input shaft 922 and in a direction opposite to that of output shaft 924 in the first through fourth driving speeds.

FIG. 22 is a table, similar to the table of FIG. 4, including the relative amounts of friction loss occurring at clutches 950, 952, and 954 and at brakes 956 and 958 for each of the gear ratios of the transmission shown in FIG. 21. FIG. 22 also shows the total relative amount of friction loss for each gear ratio of the transmission and for each clutch 950, 952, 954 and brake 956 and 958 of the transmission. In addition, the bottom row and right end column of the table include a comparison between the transmission shown in FIG. 21 and the prior art transmission shown in FIG. 3.

As compared to the prior art transmission of FIG. 3, and as shown in FIG. 22, the transmission of FIG. 21 has a 57% reduction in friction loss at first clutch 950, a 22% reduction of friction loss in the fourth driving speed, a 30% reduction of friction loss in reverse, and a 14% overall reduction of friction loss. When the transmission of FIG. 21 is installed in a vehicle, these reductions of friction loss decrease the amount of power loss and improve vehicle fuel efficiency.

One possible reason for the decreased friction loss in the transmission of FIG. 21 is because deactivated clutches and brakes are not positioned adjacent to the fastest rotating components of the transmission.

Figures 23, 24:
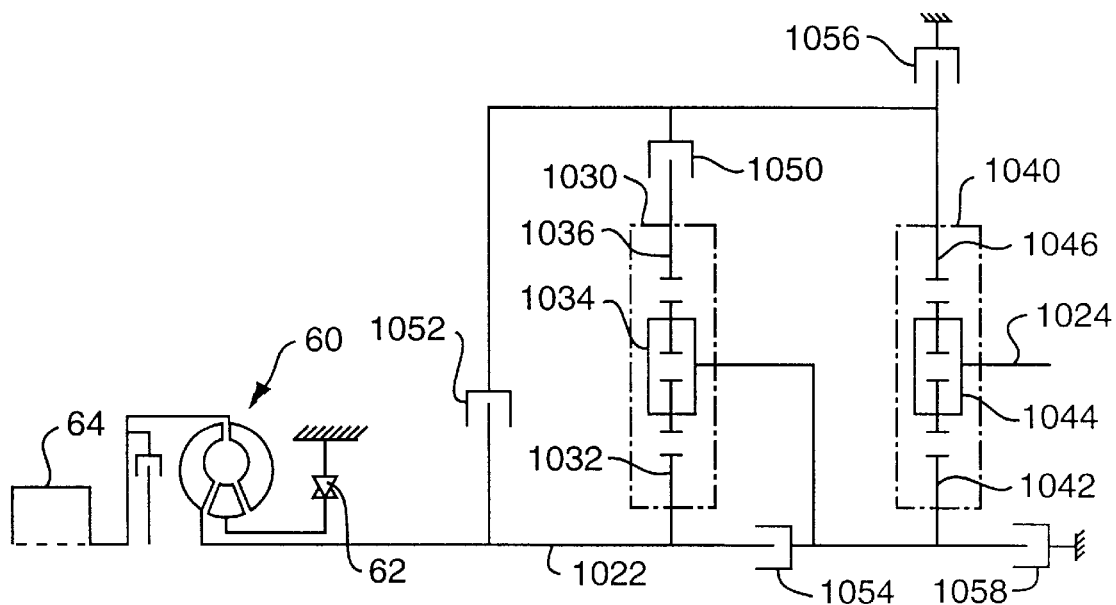
FIG. 23 is a partial schematic side view of an internal combustion engine, torque converter, one-way clutch, and tenth embodiment of the transmission of the invention.
FIG. 24 is a table showing the friction loss and reduction of friction loss for the transmission of FIG. 23.

FIG. 23 shows a tenth embodiment of the transmission of the invention. The transmission shown in FIG. 23 includes first simple planetary gear set 1030 and second simple planetary gear set 1040. First gear set 1030 is a double pinion gear set, and elements of first gear set 1030 include first sun gear 1032, first carrier 1034, and first rings gear 1036. Second gear set 1040 is a double pinion gear set, and elements of second gear set 1040 include second sun gear 1042, second carrier 1044, and second ring gear 1046. As shown in FIG. 23, first carrier 1034 is directly connected to second sun gear 1042. First sun gear 1032 and first ring gear 1036 lack a direct connection to second sun gear 1042, second carrier 1044, and second ring gear 1046.

Rotational motion is input to the transmission of FIG. 23 via input shaft 1022 connected to first sun gear 1032. When the transmission of FIG. 23 is used as an automatic transmission in an automobile, a torque converter 60 and one way clutch 62 transmit rotational motion from an internal combustion engine 64 to the input shaft 1022.

Rotational motion is output from the transmission of FIG. 23 via output shaft 1024 connected to second carrier 1044. When the transmission of FIG. 23 is used in an automobile, output shaft 1024 is connected to a drive train (not shown) for driving the drive wheels of an automobile.

As shown in FIG. 23, the transmission of the tenth embodiment also includes first clutch 1050 selectively coupling first ring gear 1036 to second ring gear 1046, second clutch 1052 selectively coupling first sun gear 1032 to second ring gear 1046, third clutch 1054 selectively coupling first sun gear 1032 to second sun gear 1042, first brake 1056 selectively braking rotational motion of second ring gear 1046, and second brake 1058 selectively braking rotational motion of the second sun gear 1042.

To change speeds (gear ratios) of the transmission shown in FIG. 23, a control system (not shown) simultaneously activates (engages) two of clutches 1050, 1052, and 1054, or one of clutches 1050, 1052, and 1054 and one of brakes 1056 and 1058. In a first driving speed of the transmission shown in FIG. 23, the controller activates first clutch 1050 and first brake 1056 so that output shaft 1024 rotates slower than input shaft 1022. In a second driving speed, the control system activates first clutch 1050 and second brake 1058 so that output shaft 1024 rotates slower than input shaft 1022, but relatively faster than when the transmission is in the first driving speed.

In a third driving speed, the control system activates first clutch 1050 and second clutch 1052 so that output shaft 1024 rotates once for each rotation of input shaft 1022. In a fourth driving speed, the control system activates second clutch 1052 and second brake 1058 so that output shaft 224 rotates faster than input shaft 1022. In reverse, the control system activates third clutch 1054 and first brake 1056 so that output shaft 1024 rotates at a rate slower than input shaft 1022 and in a direction opposite to that of output shaft 1024 in the first through fourth driving speeds.

FIG. 24 is a table, similar to the table of FIG. 4, including the relative amounts of friction loss occurring at clutches 1050, 1052, and 1054 and at brakes 1056 and 1058 for each of the gear ratios of the transmission shown in FIG. 23. FIG. 24 also shows the total relative amount of friction loss for each gear ratio of the transmission and for each clutch 1050, 1052, 1054 and brake 1056 and 1058 of the transmission. In addition, the bottom row and right end column of the table include a comparison between the transmission shown in FIG. 23 and the prior art transmission shown in FIG. 3.

As compared to the prior art transmission of FIG. 3, and as shown in FIG. 24, the transmission of FIG. 23 has a 57% reduction in friction loss at first clutch 1050, a 22% reduction of friction loss in the fourth driving speed, a 30% reduction of friction loss in reverse, and a 14% overall reduction of friction loss. When the transmission of FIG. 23 is installed in a vehicle, these reductions of friction loss decrease the amount of power loss and improve vehicle fuel efficiency.

One possible reason for the decreased friction loss in the transmission of FIG. 23 is because deactivated clutches and brakes are not positioned adjacent to the fastest rotating components of the transmission.

Figures 25, 26:
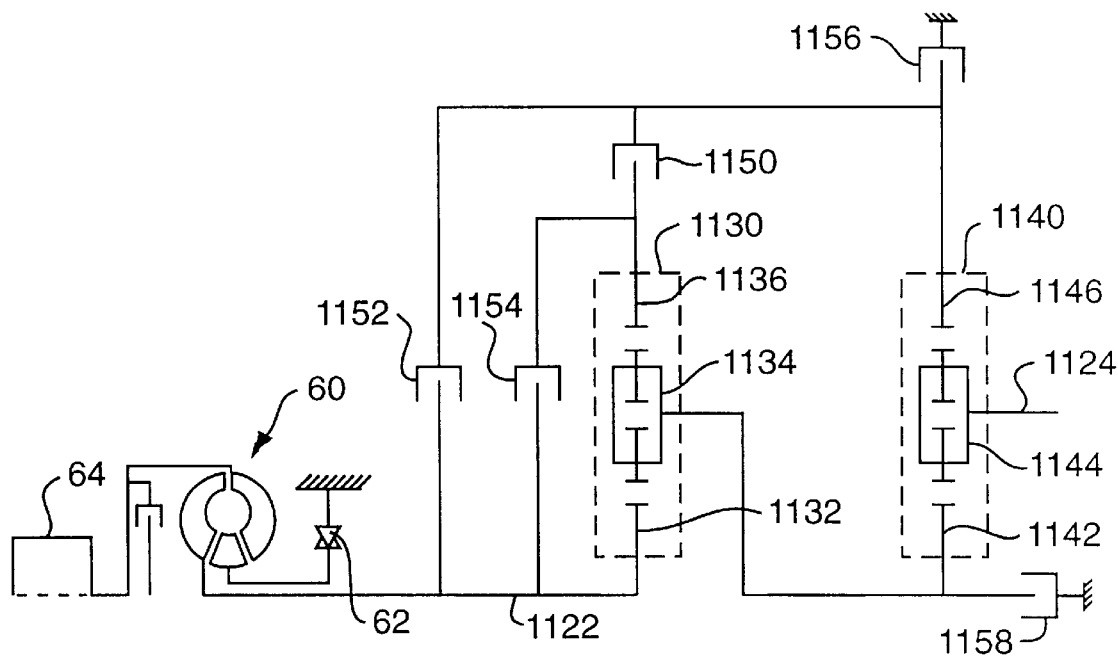
FIG. 25 is a partial schematic side view of an internal combustion engine, torque converter, one-way clutch, and eleventh embodiment of the transmission of the invention.
FIG. 26 is a table showing the friction loss and reduction of friction loss for the transmission of FIG. 25.

FIG. 25 shows an eleventh embodiment of the transmission of the invention. The transmission shown in FIG. 25 includes first simple planetary gear set 1130 and second simple planetary gear set 1140. First gear set 1130 is a double pinion gear set, and elements of first gear set 1130 include first sun gear 1132, first carrier 1134, and first ring gear 1136. Second gear set 1140 is a double pinion gear set, and elements of second gear set 1140 include second sun gear 1142, second carrier 1144, and second ring gear 1146. As shown in FIG. 25, first sun gear 1132, first carrier 1134, and first ring gear 1136 lack a direct connection to second sun gear 1142, second carrier 1144, and second ring gear 1146.

Rotational motion is input to the transmission of FIG. 25 via input shaft 1122 connected to first sun gear 1132. When the transmission of FIG. 25 is used as an automatic transmission in an automobile, a torque converter 60 and one way clutch 62 transmit rotational motion from an internal combustion engine 64 to the input shaft 1122.

Rotational motion is output from the transmission of FIG. 25 via output shaft 1124 connected to second carrier 1144. When the transmission of FIG. 25 is used in an automobile, output shaft 1124 is connected to a drive train (not shown) for driving the drive wheels of an automobile.

As shown in FIG. 25, the transmission of the eleventh embodiment also includes first clutch 1150 selectively coupling first ring gear 1136 to second ring gear 1146, second clutch 1152 selectively coupling first sun gear 1132 to second ring gear 1146, third clutch 1154 selectively coupling first sun gear 1132 to first ring gear 1136, first brake 1156 selectively braking rotational motion of second ring gear 1146, and second brake 1158 selectively braking rotational motion of the second sun gear 1142.

To change speeds (gear ratios) of the transmission shown in FIG. 25, a control system (not shown) simultaneously activates (engages) two of clutches 1150, 1152, and 1154, or one of clutches 1150, 1152, and 1154 and one of brakes 1156 and 1158. In a first driving speed of the transmission shown in FIG. 25, the controller activates first clutch 1150 and first brake 1156 so that output shaft 1124 rotates slower than input shaft 1122. In a second driving speed, the control system activates first clutch 1150 and second brake 1158 so that output shaft 1124 rotates slower than input shaft 1122, but relatively faster than when the transmission is in the first driving speed.

In a third driving speed, the control system activates first clutch 1150 and second clutch 1152 so that output shaft 1124 rotates once for each rotation of input shaft 1122. In a fourth driving speed, the control system activates second clutch 1154 and second brake 1158 so that output shaft 1124 rotates faster than input shaft 1122. In reverse, the control system activates third clutch 1154 and first brake 1156 so that output shaft 1124 rotates at a rate slower than input shaft 1122 and in a direction opposite to that of output shaft 1124 in the first through fourth driving speeds.

FIG. 26 is a table, similar to the table of FIG. 4, including the relative amounts of friction loss occurring at clutches 1150, 152, and 1154 and at brakes 1156 and 1158 for each of the gear ratios of the transmission shown in FIG. 25. FIG. 26 also shows the total relative amount of friction loss for each gear ratio of the transmission and for each clutch 1150, 1152, 1154 and brake 1156 and 1158 of the transmission. In addition, the bottom row and right end column of the table include a comparison between the transmission shown in FIG. 25 and the prior art transmission shown in FIG. 3.

As compared to the prior art transmission of FIG. 3, and as shown in FIG. 26, the transmission of FIG. 25 has a 57% reduction in friction loss at first clutch 1150, a 43% reduction in friction loss at third clutch 1154, a 22% reduction of friction loss in the first driving speed, a 22% reduction of friction loss in the second driving speed, a 36% reduction of friction loss in the fourth driving speed, a 30% reduction of friction loss in reverse, and a 24% overall reduction of friction loss. When the transmission of FIG. 25 is installed in a vehicle, these reductions of friction loss decrease the amount of power loss and improve vehicle fuel efficiency.

One possible reason for the decreased friction loss in the transmission of FIG. 25 is because deactivated clutches and brakes are not positioned adjacent to the fastest rotating components of the transmission.

Figures 27, 28:
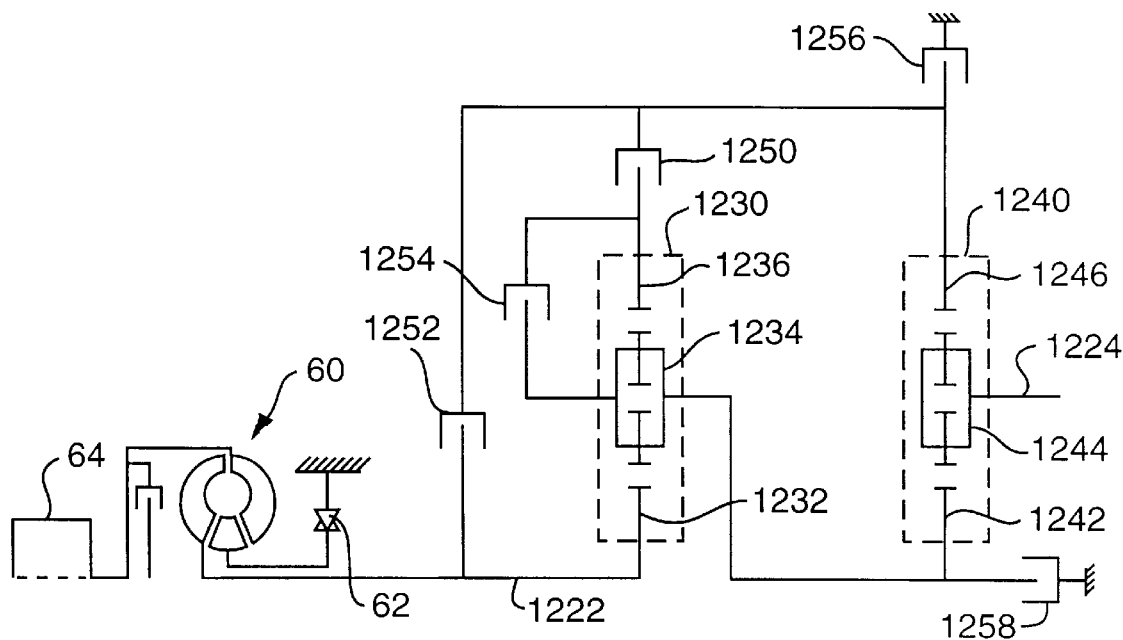
FIG. 27 is a partial schematic side view of an internal combustion engine, torque converter, one-way clutch, and twelfth embodiment of the transmission of the invention.
FIG. 28 is a table showing the friction loss and reduction of friction loss for the transmission of FIG. 27.

FIG. 27 shows a twelfth embodiment of the transmission of the invention. The transmission shown in FIG. 27 includes first simple planetary gear set 1230 and second simple planetary gear set 1240. First gear set 1230 is a double pinion gear set, and elements of first gear set 1230 include first sun gear 1232, first carrier 1234, and first ring gear 1236. Second gear set 1240 is a double pinion gear set, and elements of second gear set 1240 include second sun gear 1242, second carrier 1244, and second ring gear 1246. As shown in FIG. 27, first carrier 1234 is directly connected to second sun gear 1242. First sun gear 1232 and first ring gear 1236 lack a direct connection to second sun gear 1242, second carrier 1244, and second ring gear 1246.

Rotational motion is input to the transmission of FIG. 27 via input shaft 1222 connected to first sun gear 1232. When the transmission of FIG. 27 is used as an automatic transmission in an automobile, a torque converter 60 and one way clutch 62 transmit rotational motion from an internal combustion engine 64 to the input shaft 1222.

Rotational motion is output from the transmission of FIG. 27 via output shaft 1224 connected to second carrier 1244.

When the transmission of FIG. 27 is used in an automobile, output shaft 1224 is connected to a drive train (not shown) for driving the drive wheels of an automobile.

As shown in FIG. 27, the transmission of the twelfth embodiment also includes first clutch 1250 selectively coupling first ring gear 1236 to second ring gear 1246, second clutch 1252 selectively coupling first sun gear 1232 to second ring gear 1246, third clutch 1254 selectively coupling first sun gear 1232 to first carrier 1234, first brake 1256 selectively braking rotational motion of second ring gear 1246, and second brake 1258 selectively braking rotational motion of the second sun gear 1242.

To change speeds (gear ratios) of the transmission shown in FIG. 27, a control system (not shown) simultaneously activates (engages) all two of clutches 1250, 1252, and 1254, or one of clutches 1250, 1252, and 1254 and one of brakes 1256 and 1258. In a first driving speed of the transmission shown in FIG. 27, the controller activates first clutch 1250 and first brake 1256 so that output shaft 1224 rotates slower than input shaft 1222. In a second driving speed, the control system activates first clutch 250 and second brake 1258 so that output shaft 1224 rotates slower than input shaft 1222, but relatively faster than when the transmission is in the first driving speed.

In a third driving speed, the control system activates first clutch 1250 and second clutch 1252 so that output shaft 1224 rotates once for each rotation of input shaft 1222. In a fourth driving speed, the control system activates second clutch 1252 and second brake 1258 so that output shaft 1224 rotates faster than input shaft 1222. In reverse, the control system activates second clutch 1252 and first brake 1256 so that output shaft 1224 rotates at a rate slower than input shaft 1222 and in a direction opposite to that of output shaft 1224 in the first through fourth driving speeds.

FIG. 28 is a table, similar to the table of FIG. 4, including the relative amounts of friction loss occurring at clutches 1250, 1252, and 1254 and at brakes 1256 and 1258 for each of the gear ratios of the transmission shown in FIG. 27. FIG. 28 also shows the total relative amount of friction loss for each gear ratio of the transmission and for each clutch 1250, 1252, 1254 and brake 1256 and 1258 of the transmission. In addition, the bottom row and right end column of the table include a comparison between the transmission shown in FIG. 27 and the prior art transmission shown in FIG. 3.

As compared to the prior art transmission of FIG. 3, and as shown in FIG. 28, the transmission of FIG. 27 has a 57% reduction in friction loss at first clutch 1250, a 57% reduction in friction loss at third clutch 1254, a 28% reduction of friction loss in the first driving speed, a 28% reduction of friction loss in the second driving speed, a 40% reduction of friction loss in the fourth driving speed, a 30% reduction of friction loss in reverse, and a 28% overall reduction of friction loss. When the transmission of FIG. 27 is installed in a vehicle, these reductions of friction loss decrease the amount of power loss and improve vehicle fuel efficiency.

One possible reason for the decreased friction loss in the transmission of FIG. 27 is because deactivated clutches and brakes are not positioned adjacent to the fastest rotating components of the transmission.

Figures 29, 30:
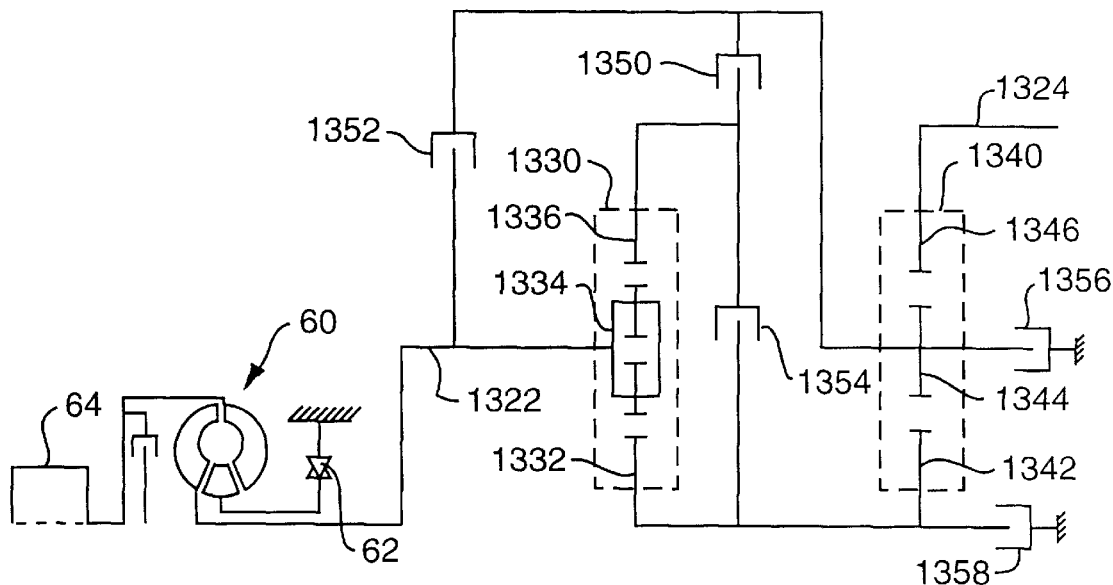
FIG. 29 is a partial schematic side view of an internal combustion engine, torque converter, one-way clutch, and thirteenth embodiment of the transmission of the invention.
FIG. 30 is a table showing the friction loss and reduction of friction loss for the transmission of FIG. 29.

FIG. 29 shows a thirteenth embodiment of the transmission of the invention. The transmission shown in FIG. 29 includes first simple planetary gear set 1330 and second simple planetary gear set 1340. First gear set 1330 is a double pinion gear set, and elements of first gear set 1330 include first sun gear 1332, first carrier 1334, and first ring gear 1336. Second gear set 1340 is a single pinion gear set, and elements of second gear set 1340 include second sun gear 1342, second carrier 1344, and second ring gear 1346. As shown in FIG. 29, first sun gear 1332 is directly connected to second sun gear 1342. First carrier 1334 and first ring gear 1336 lack a direct connection to second sun gear 1342, second carrier 1344, and second ring gear 1346.

Rotational motion is input to the transmission of FIG. 29 via input shaft 222 connected to first carrier 1334. When the transmission of FIG. 29 is used as an automatic transmission in an automobile, a torque converter 60 and one way clutch 62 transmit rotational motion from an internal combustion engine 64 to the input shaft 1322.

Rotational motion is output from the transmission of FIG. 29 via output shaft 1324 connected to second ring gear 1346. When the transmission of FIG. 29 is used in an automobile, output shaft 1324 is connected to a drive train (not shown) for driving the drive wheels of an automobile.

As shown in FIG. 29, the transmission of the thirteenth embodiment also includes first clutch 1350 selectively coupling first ring gear 1336 to second carrier 1344, second clutch 1352 selectively coupling first carrier 1334 to second carrier 1344, third clutch 1354 selectively coupling first sun gear 1332 to first ring gear 1336, first brake 1356 selectively braking rotational motion of second carrier 1344, and second brake 1358 selectively braking rotational motion of the second sun gear 1342.

To change speeds (gear ratios) of the transmission shown in FIG. 29, a control system (not shown) simultaneously activates (engages) two of clutches 1350, 1352, and 1354, or one of clutches 1350, 1352, and 1354 and one of brakes 1356 and 1358. In a first driving speed of the transmission shown in FIG. 29, the controller activates first clutch 1350 and first brake 1356 so that output shaft 1324 rotates slower than input shaft 1322. In a second driving speed, the control system activates first clutch 1350 and second brake 1358 so that output shaft 1324 rotates slower than input shaft 1322, but relatively faster than when the transmission is in the first driving speed.

In a third driving speed, the control system activates first clutch 1350 and second clutch 1352, so that output shaft 1324 rotates once for each rotation of input shaft 1322. In a fourth driving speed, the control system activates second clutch 1352 and second brake 1358 so that output shaft 1324 rotates faster than input shaft 1322. In reverse, the control system activates third clutch 1354 and first brake 1356 so that output shaft 1324 rotates at a rate slower than input shaft 1322 and in a direction opposite to that of output shaft 1324 in the first through fourth driving speeds.

FIG. 30 is a table, similar to the table of FIG. 4, including the relative amounts of friction loss occurring at clutches 1350, 1352, and 1354 and at brakes 1356 and 1358 for each of the gear ratios of the transmission shown in FIG. 29. FIG. 30 also shows the total relative amount of friction loss for each gear ratio of the transmission and for each clutch 1350, 1352, 1354 and brake 1356 and 1358 of the transmission. In addition, the bottom row and right end column of the table include a comparison between the transmission shown in FIG. 29 and the prior art transmission shown in FIG. 3.

As compared to the prior art transmission of FIG. 3, and as shown in FIG. 30, the transmission of FIG. 29 has a 57% reduction in friction loss at first clutch 1350, a 57% reduction in friction loss at third clutch 1354, a 28% reduction of friction loss in the first driving speed, a 28% reduction of friction loss in the second driving speed, a 40% reduction of friction loss in the fourth driving speed, a 30% reduction of friction loss in reverse, and a 28% overall reduction of friction loss. When the transmission of FIG. 29 is installed in a vehicle, these reductions of friction loss decrease the amount of power loss and improve vehicle fuel efficiency.

One possible reason for the decreased friction loss in the transmission of FIG. 29 is because deactivated clutches and brakes are not positioned adjacent to the fastest rotating components of the transmission.

Figures 31, 32:
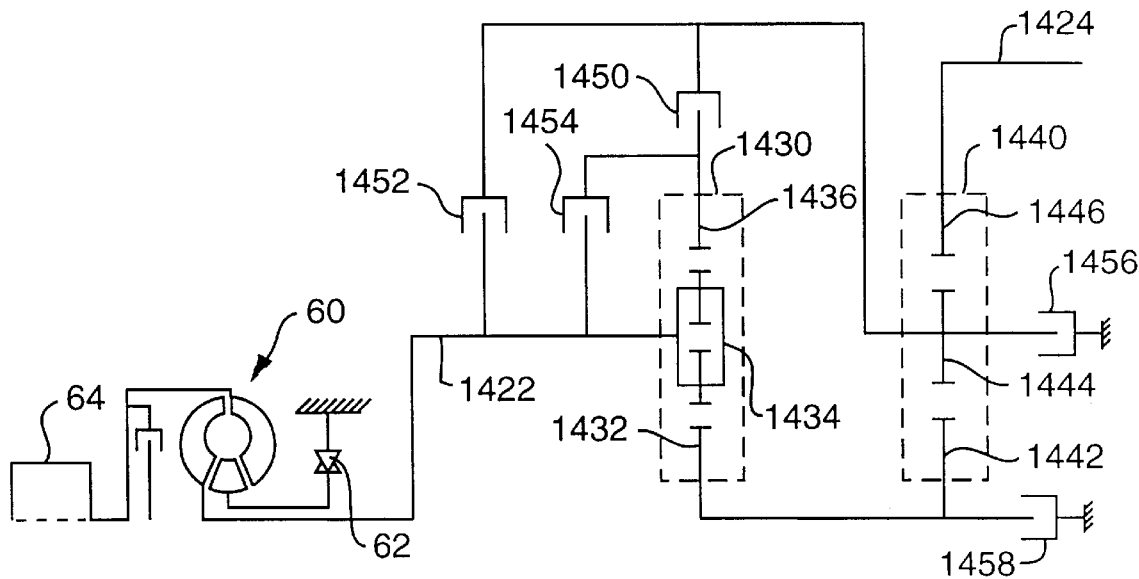
FIG. 31 is a partial schematic side view of an internal combustion engine, torque converter, one-way clutch, and fourteenth embodiment of the transmission of the invention.
FIG. 32 is a table showing the friction loss and reduction of friction loss for the transmission of FIG. 31.

FIG. 31 shows a fourteenth embodiment of the transmission of the invention. The transmission shown in FIG. 31 includes first simple planetary gear set 1430 and second simple planetary gear set 1440. First gear set 1430 is a double pinion gear set, and elements of first gear set 1430 include first sun gear 1432, first carrier 1434, and first ring gear 1436. Second gear set 1440 is a single pinion gear set, and elements of second gear set 1440 include second sun gear 1442, second carrier 1444, and second ring gear 1446. As shown in FIG. 31, first sun gear 1432 is directly connected to second sun gear 1442. First carrier 1434 and first ring gear 1436 lack a direct connection to second sun gear 1442, second carrier 1444, and second ring gear 1446.

Rotational motion is input to the transmission of FIG. 31 via input shaft 1422 connected to first carrier 1434. When the transmission of FIG. 31 is used as an automatic transmission in an automobile, a torque converter 60 and one way clutch 62 transmit rotational motion from an internal combustion engine 64 to the input shaft 1422.

Rotational motion is output from the transmission of FIG. 31 via output shaft 1424 connected to second ring gear 1446. When the transmission of FIG. 31 is used in an automobile, output shaft 1424 is connected to a drive train (not shown) for driving the drive wheels of an automobile.

As shown in FIG. 31, the transmission of the fourteenth embodiment also includes first clutch 1450 selectively coupling first ring gear 1436 to second carrier 1444, second clutch 1452 selectively coupling first carrier 1434 to second carrier 1444, third clutch 1454 selectively coupling first carrier 1434 to first ring gear 1436, first brake 1456 selectively braking rotational motion of second carrier 1444, and second brake 1458 selectively braking rotational motion of the second sun gear 1442.

To change speeds (gear ratios) of the transmission shown in FIG. 31, a control system (not shown) simultaneously activates (engages) two of clutches 1450, 1452, and 1454, or one of clutches 1450, 1452, and 1454 and one of brakes 1456 and 1458. In a first driving speed of the transmission shown in FIG. 31, the controller activates first clutch 1450 and first brake 1456 so that output shaft 1424 rotates slower than input shaft 1422. In a second driving speed, the control system activates first clutch 1450 and second brake 1458 so that output shaft 1424 rotates slower than input shaft 1422, but relatively faster than when the transmission is in the first driving speed.

In a third driving speed, the control system activates first clutch 1450 and second clutch 1452 so that output shaft 1424 rotates once for each rotation of input shaft 1422. In a fourth driving speed, the control system activates second clutch 1352 and second brake 1458 so that output shaft 1424 rotates faster than input shaft 1422. In reverse, the control system activates third clutch 1454 and first brake 1456 so that output shaft 1424 rotates at a rate slower than input shaft 1422 and in a direction opposite to that of output shaft 1424 in the first through fourth driving speeds.

FIG. 32 is a table, similar to the table of FIG. 4, including the relative amounts of friction loss occurring at clutches 1450, 1452, and 1454 and at brakes 1456 and 1458 for each of the gear ratios of the transmission shown in FIG. 31. FIG. 32 also shows the total relative amount of friction loss for each gear ratio of the transmission and for each clutch 1450, 1452, 1454 and brake 1456 and 1458 of the transmission. In addition, the bottom row and right end column of the table include a comparison between the transmission shown in FIG. 31 and the prior art transmission shown in FIG. 3.

As compared to the prior art transmission of FIG. 3, and as shown in FIG. 32, the transmission of FIG. 31 has a 57% reduction in friction loss at first clutch 1450, a 43% reduction in friction loss at third clutch 1454, a 22% reduction of friction loss in the first driving speed, a 36% reduction of friction loss in the second driving speed, a 40% reduction of friction loss in the fourth driving speed, a 30% reduction of friction loss in reverse, and a 24% overall reduction of friction loss. When the transmission of FIG. 31 is installed in a vehicle, these reductions of friction loss decrease the amount of power loss and improve vehicle fuel efficiency.

One possible reason for the decreased friction loss in the transmission of FIG. 31 is because deactivated clutches and brakes are not positioned adjacent to the fastest rotating components of the transmission.

Figures 33, 34:
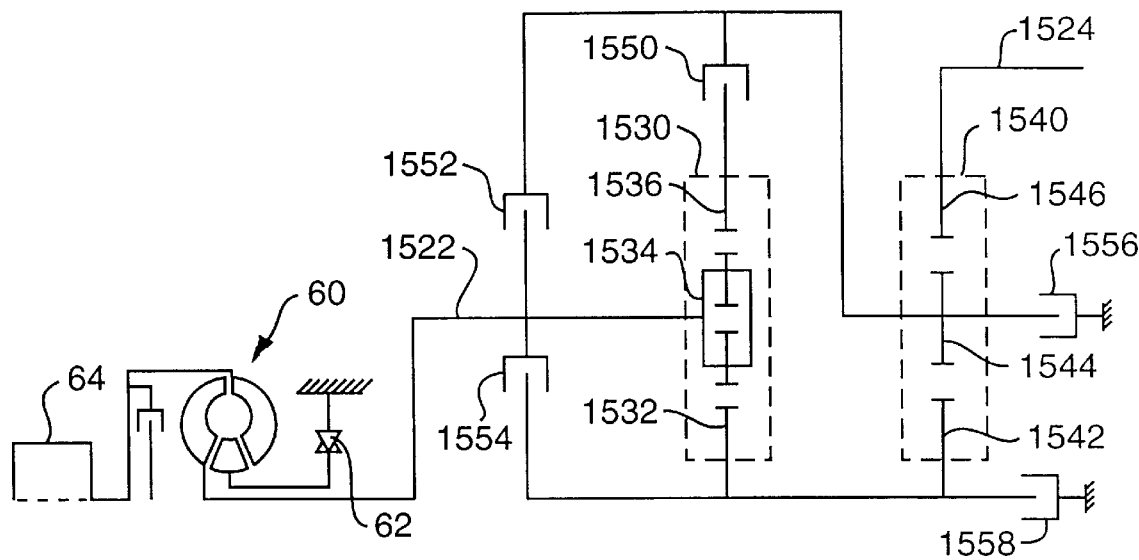
FIG. 33 is a partial schematic side view of an internal combustion engine, torque converter, one-way clutch, and fifteenth embodiment of the transmission of the invention.
FIG. 34 is a table showing the friction loss and reduction of friction loss for the transmission of FIG. 33.

FIG. 33 shows a fifteenth embodiment of the transmission of the invention. The transmission shown in FIG. 33 includes first simple planetary gear set 1530 and second simple planetary gear set 1540. First gear set 1530 is a double pinion gear set, and elements of first gear set 1530 include first sun gear 1532, first carrier 1534, and first ring gear 1536. Second gear set 1540 is a single pinion gear set, and elements of second gear set 1540 include second sun gear 1542, second carrier 1544, and second ring gear 1546. As shown in FIG. 33, first sun gear 1532 is directly connected to second sun gear 1542. First carrier 1534 and first ring gear 1536 lack a direct connection to second sun gear 1542, second carrier 1544, and second ring gear 1546.

Rotational motion is input to the transmission of FIG. 33 via input shaft 1522 connected to first carrier 1534. When the transmission of FIG. 33 is used as an automatic transmission in an automobile, a torque converter 60 and one way clutch 62 transmit rotational motion from an internal combustion engine 64 to the input shaft 1522.

Rotational motion is output from the transmission of FIG. 33 via output shaft 1524 connected to second ring gear 1546. When the transmission of FIG. 33 is used in an automobile, output shaft 1524 is connected to a drive train (not shown) for driving the drive wheels of an automobile.

As shown in FIG. 33, the transmission of the fifteenth embodiment also includes first clutch 1550 selectively coupling first ring gear 1536 to second carrier 1544, second clutch 1552 selectively coupling first carrier 1534 to second carrier 1544, third clutch 1554 selectively coupling first carrier 1534 to first sun gear 1532, first brake 1556 selectively braking rotational motion of second carrier 1544, and second brake 1558 selectively braking rotational motion of the second sun gear 1542.

To change speeds (gear ratios) of the transmission shown in FIG. 33, a control system (not shown) simultaneously activates (engages) two of clutches 1550, 1552, and 1554, or one of clutches 1550, 1552, and 1554 and one of brakes 1556 and 1558. In a first driving speed of the transmission shown in FIG. 33, the controller activates first clutch 1550 and first brake 1556 so that output shaft 1524 rotates slower than input shaft 1522. In a second driving speed, the control system activates first clutch 1550 and second brake 1558 so that output shaft 1524 rotates slower than input shaft 1522, but relatively faster than when the transmission is in the first driving speed.

In a third driving speed, the control system activates first clutch 1550 and second clutch 1552 so that output shaft 1524 rotates once for each rotation of input shaft 1522. In a fourth driving speed, the control system activates second clutch 1552 and second brake 1558 so that output shaft 1524 rotates faster than input shaft 1522. In reverse, the control system activates third clutch 1554 and first brake 1556 so that output shaft 1524 rotates at a rate slower than input shaft 1522 and in a direction opposite to that of output shaft 1524 in the first through fourth driving speeds.

FIG. 34 is a table, similar to the table of FIG. 4, including the relative amounts of friction loss occurring at clutches 1550, 1552, and 1554 and at brakes 1556 and 1558 for each of the gear ratios of the transmission shown in FIG. 33. FIG. 34 also shows the total relative amount of friction loss for each gear ratio of the transmission and for each clutch 1550, 1552, 1554 and brake 1556 and 1558 of the transmission. In addition, the bottom row and right end column of the table include a comparison between the transmission shown in FIG. 33 and the prior art transmission shown in FIG. 3.

As compared to the prior art transmission of FIG. 3, and as shown in FIG. 34, the transmission of FIG. 33 has a 27% reduction in friction loss at first clutch 1550, a 22% reduction of friction loss in the fourth driving speed, a 30% reduction of friction loss in reverse, and a 14% overall reduction of friction loss. When the transmission of FIG. 33 is installed in a vehicle, these reductions of friction loss decrease the amount of power loss and improve vehicle fuel efficiency.

One possible reason for the decreased friction loss in the transmission of FIG. 33 is because deactivated clutches and brakes are not positioned adjacent to the fastest rotating components of the transmission.

Figures 35, 36:
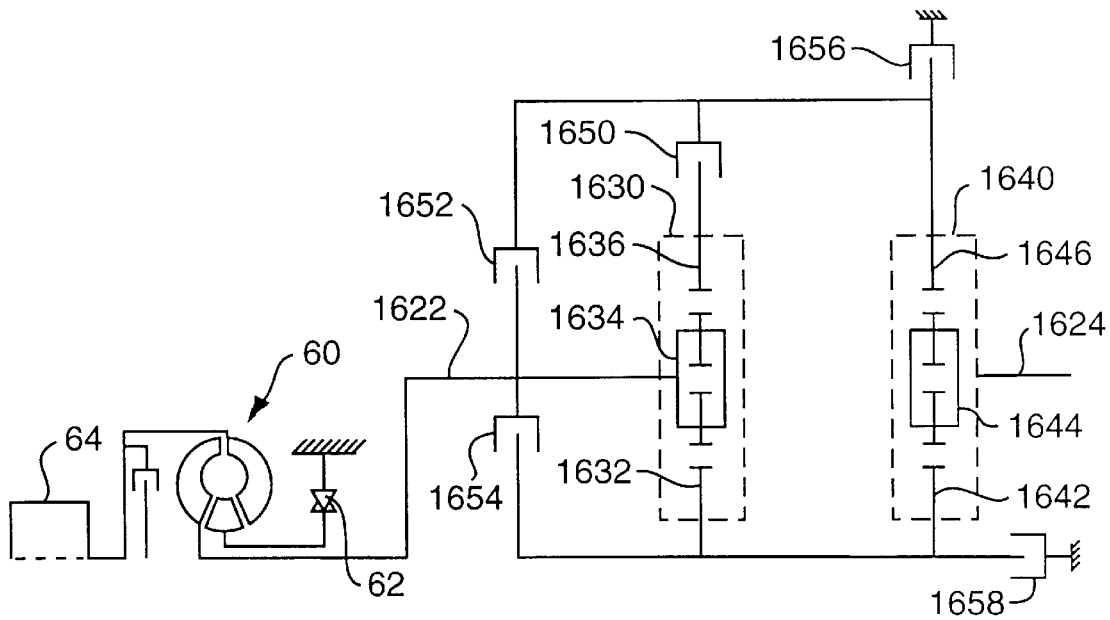
FIG. 35 is a partial schematic side view of an internal combustion engine, torque converter, one-way clutch, and sixteenth embodiment of the transmission of the invention.
FIG. 36 is a table showing the friction loss and reduction of friction loss for the transmission of FIG. 35.

FIG. 35 shows a sixteenth embodiment of the transmission of the invention. The transmission shown in FIG. 35 includes first simple planetary gear set 1630 and second simple planetary gear set 1640. First gear set 1630 is a double pinion gear set, and elements of first gear set 1630 include first sun gear 1632, first carrier 1634, and first ring gear 1636. Second gear set 1640 is a double pinion gear set, and elements of second gear set 1440 include second sun gear 1642, second carrier 1644, and second ring gear 1646. As shown in FIG. 35, first sun gear 1632 is directly connected to second sun gear 1642. First carrier 1634 and first ring gear 1536 lack a direct connection to second sun gear 1642, second carrier 1644, and second ring gear 1646.

Rotational motion is input to the transmission of FIG. 35 via input shaft 1622 connected to first carrier 1634. When the transmission of FIG. 35 is used as an automatic transmission in an automobile, a torque converter 60 and one way clutch 62 transmit rotational motion from an internal combustion engine 64 to the input shaft 1622.

Rotational motion is output from the transmission of FIG. 35 via output shaft 1624 connected to second carrier 1644. When the transmission of FIG. 35 is used in an automobile, output shaft 1624 is connected to a drive train (not shown) for driving the drive wheels of an automobile.

As shown in FIG. 35, the transmission of the sixteenth embodiment also includes first clutch 1650 selectively coupling first carrier 1634 to second ring gear 1646, second clutch 1652 selectively coupling first carrier 1634 to second ring gear 1646, third clutch 1654 selectively coupling first carrier 1534 to first sun gear 1632, first brake 1656 selectively braking rotational motion of second ring gear 1646, and second brake 1658 selectively braking rotational motion of the second sun gear 1642.

To change speeds (gear ratios) of the transmission shown in FIG. 35, a control system (not shown) simultaneously activates (engages) two of clutches 1650, 1652, and 1654, or one of clutches 1650, 1652, and 1654 and one of brakes 1656 and 1558. In a first driving speed of the transmission shown in FIG. 35, the controller activates first clutch 1650 and first brake 1656 so that output shaft 1624 rotates slower than input shaft 1622. In a second driving speed, the control system activates first clutch 1650 and second brake 1658 so that output shaft 1624 rotates slower than input shaft 1622, but relatively faster than when the transmission is in the first driving speed.

In a third driving speed, the control system activates first clutch 1650 and second clutch 1652 so that output shaft 1624 rotates once for each rotation of input shaft 1622. In a fourth driving speed, the control system activates second clutch 1652 and second brake 1658 so that output shaft 1624 rotates faster than input shaft 1622. In reverse, the control system activates third clutch 1654 and first brake 1656 so that output shaft 1624 rotates at a rate slower than input shaft 1622 and in a direction opposite to that of output shaft 1624 in the first through fourth driving speeds.

FIG. 36 is a table, similar to the table of FIG. 4, including the relative amounts of friction loss occurring at clutches 1650, 1652, and 1654 and at brakes 1656 and 1658 for each of the gear ratios of the transmission shown in FIG. 35. FIG. 36 also shows the total relative amount of friction loss for each gear ratio of the transmission and for each clutch 1650, 1652, 1654 and brake 1656 and 1658 of the transmission. In addition, the bottom row and right end column of the table include a comparison between the transmission shown in FIG. 35 and the prior art transmission shown in FIG. 3.

As compared to the prior art transmission of FIG. 3, and as shown in FIG. 36, the transmission of FIG. 35 has a 57% reduction in friction loss at first clutch 1650, a 22% reduction of friction loss in the fourth driving speed, a 30% reduction of friction loss in reverse, and a 14% overall reduction of friction loss. When the transmission of FIG. 35 is installed in a vehicle, these reductions of friction loss decrease the amount of power loss and improve vehicle fuel efficiency.

One possible reason for the decreased friction loss in the transmission of FIG. 35 is because deactivated clutches and brakes are not positioned adjacent to the fastest rotating components of the transmission.

Figures 37, 38:
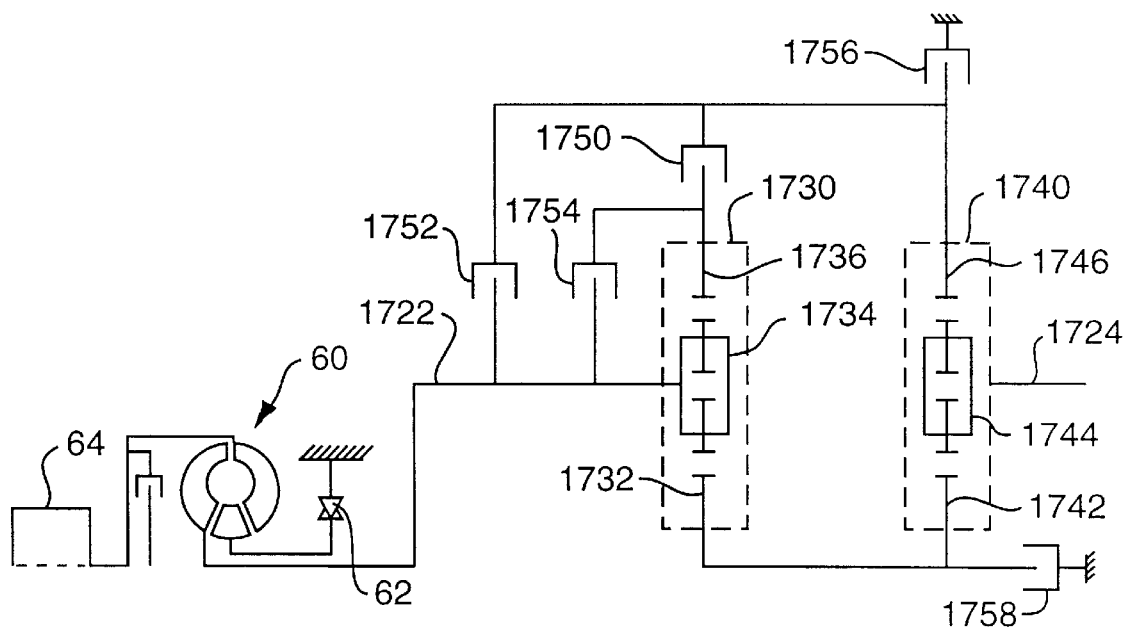
FIG. 37 is a partial schematic side view of an internal combustion engine, torque converter, one-way clutch, and seventeenth embodiment of the transmission of the invention.
FIG. 38 is a table showing the friction loss and reduction of friction loss for the transmission of FIG. 37.

FIG. 37 shows a seventeenth embodiment of the transmission of the invention. The transmission shown in FIG. 37 includes first simple planetary gear set 1730 and second simple planetary gear set 1740. First gear set 1730 is a double pinion gear set, and elements of first gear set 1730 include first sun gear 1732, first carrier 1734, and first ring gear 1736. Second gear set 1740 is a double pinion gear set, and elements of second gear set 1740 include second sun gear 1742, second carrier 1744, and second ring gear 1746. As shown in FIG. 37, first sun gear 1732, first carrier 1734, and first ring gear 1736 lack a direct connection to second sun gear 1742, second carrier 1744, and second ring gear 1746.

Rotational motion is input to the transmission of FIG. 37 via input shaft 1722 connected to first carrier 1734. When the transmission of FIG. 37 is used as an automatic transmission in an automobile, a torque converter 60 and one way clutch 62 transmit rotational motion from an internal combustion engine 64 to the input shaft 1722.

Rotational motion is output from the transmission of FIG. 37 via output shaft 1724 connected to second carrier 1744.

When the transmission of FIG. 37 is used in an automobile, output shaft 1724 is connected to a drive train (not shown) for driving the drive wheels of an automobile.

As shown in FIG. 37, the transmission of the seventeenth embodiment also includes first clutch 1750 selectively coupling first ring gear 1736 to second ring gear 1746, second clutch 1752 selectively coupling first carrier 1734 to second ring gear 1746, third clutch 1754 selectively coupling first carrier 1734 to first ring gear 1736, first brake 1756 selectively braking rotational motion of second ring gear 1746, and second brake 1758 selectively braking rotational motion of the second sun gear 1742.

To change speeds (gear ratios) of the transmission shown in FIG. 37, a control system (not shown) simultaneously activates (engages) two of clutches 1750, 1752, and 1754, or one of clutches 1750, 1752, and 1754 and one of brakes 1756 and 1758. In a first driving speed of the transmission shown in FIG. 35, the controller activates first clutch 1750 and first brake 1756 so that output shaft 1724 rotates slower than input shaft 1722. In a second driving speed, the control system activates first clutch 1750 and second brake 1758 so that output shaft 1724 rotates slower than input shaft 1722, but relatively faster than when the transmission is in the first driving speed.

In a third driving speed, the control system activates first clutch 1750 and second clutch 1752 so that output shaft 1724 rotates once for each rotation of input shaft 1722. In a fourth driving speed, the control system activates second clutch 1752 and second brake 1758 so that output shaft 1724 rotates faster than input shaft 1722. In reverse, the control system activates third clutch 1754 and first brake 1756 so that output shaft 1724 rotates at a rate slower than input shaft 1722 and in a direction opposite to that of output shaft 1724 in the first through fourth driving speeds.

FIG. 38 is a table, similar to the table of FIG. 4, including the relative amounts of friction loss occurring at clutches 1750, 1752, and 1754 and at brakes 1756 and 1758 for each of the gear ratios of the transmission shown in FIG. 37. FIG. 38 also shows the total relative amount of friction loss for each gear ratio of the transmission and for each clutch 1750, 1752, 1754 and brake 1756 and 1758 of the transmission. In addition, the bottom row and right end column of the table include a comparison between the transmission shown in FIG. 37 and the prior art transmission shown in FIG. 3.

As compared to the prior art transmission of FIG. 3, and as shown in FIG. 38, the transmission of FIG. 37 has a 57% reduction in friction loss at first clutch 1750, a 43% reduction in friction loss at third clutch 1754, a 22% reduction of friction loss in the first driving speed, a 22% reduction of friction loss in the second driving speed, a 46% reduction of friction loss in the fourth driving speed, a 30% reduction of friction loss in reverse, and a 24% overall reduction of friction loss. When the transmission of FIG. 37 is installed in a vehicle, these reductions of friction loss decrease the amount of power loss and improve vehicle fuel efficiency.

One possible reason for the decreased friction loss may also be reduced in the transmission of FIG. 37 is because deactivated clutches and brakes are not positioned adjacent to the fastest rotating components of the transmission.

Figures 39, 40:
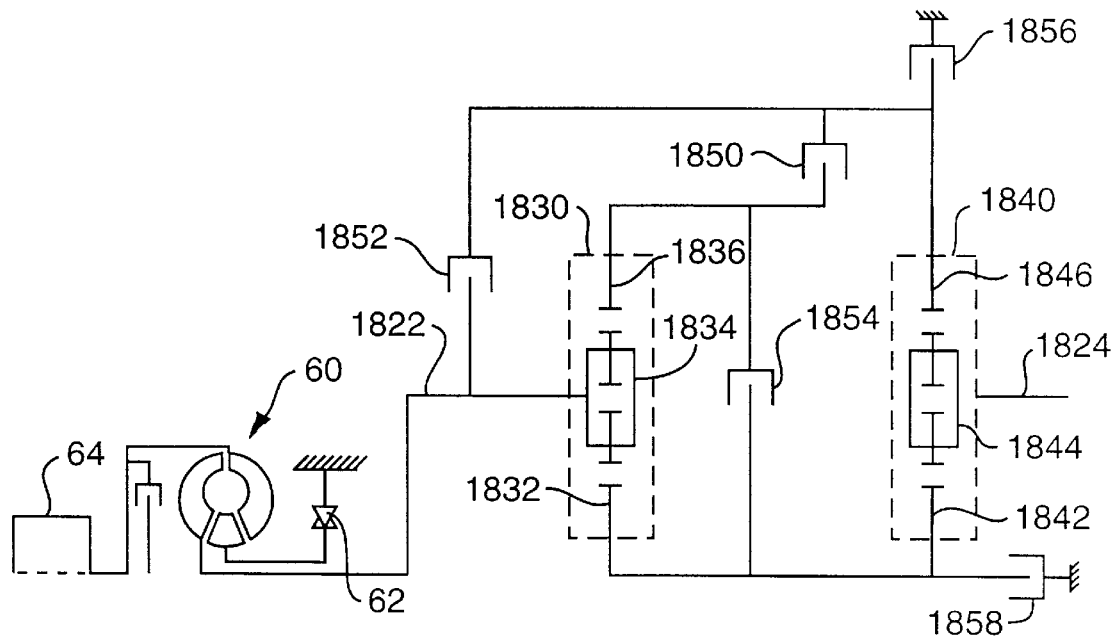
FIG. 39 is a partial schematic side view of an internal combustion engine, torque converter, one-way clutch, and eighteenth embodiment of the transmission of the invention.
FIG. 40 is a table showing the friction loss and reduction of friction loss for the transmission of FIG. 39.

FIG. 39 shows an eighteenth embodiment of the transmission of the invention. The transmission shown in FIG. 39 includes first simple planetary gear set 1830 and second simple planetary gear set 1840. First gear set 1830 is a double pinion gear set, and elements of first gear set 1830 include first sun gear 1832, first carrier 1834, and first ring gear 1836. Second gear set 1840 is a double pinion gear set, and elements of second gear set 1840 include second sun gear 1842, second carrier 1844, and second ring gear 1846. As shown in FIG. 39, first sun gear 1832 is directly connected to second sun gear 1842. First carrier 1834 and first ring gear 1836 lack a direct connection to second sun gear 1842, second carrier 1844, and second ring gear 1846.

Rotational motion is input to the transmission of FIG. 39 via input shaft 1822 connected to first carrier 1834. When the transmission of FIG. 39 is used as an automatic transmission in an automobile, a torque converter 60 and one way clutch 62 transmit rotational motion from an internal combustion engine 64 to the input shaft 1822.

Rotational motion is output from the transmission of FIG. 39 via output shaft 1824 connected to second carrier 1844. When the transmission of FIG. 39 is used in an automobile, output shaft 1824 is connected to a drive train (not shown) for driving the drive wheels of an automobile.

As shown in FIG. 39, the transmission of the eighteenth embodiment also includes first clutch 1850 selectively coupling first ring gear 1836 to second ring gear 1846, second clutch 1852 selectively coupling first carrier 1834 to second ring gear 1846, third clutch 1854 selectively coupling first ring gear 1836 to first sun gear 1832, first brake 1856 selectively braking rotational motion of second ring gear 1846, and second brake 1858 selectively braking rotational motion of the second sun gear 1842.

To change speeds (gear ratios) of the transmission shown in FIG. 39, a control system (not shown) simultaneously activates (engages) two of clutches 1850, 1852, and 1654, or one of clutches 1850, 1852, and 1854 and one of brakes 1856 and 1858. In a first driving speed of the transmission shown in FIG. 39, the controller activates first clutch 1850 and first brake 1856 so that output shaft 1824 rotates slower than input shaft 1822. In a second driving speed, the control system activates first clutch 1850 and second brake 1858 so that output shaft 1824 rotates slower than input shaft 1822, but relatively faster than when the transmission is in the first driving speed.

In a third driving speed, the control system activates first clutch 1850 and second clutch 1852, and third clutch 1854 so that output shaft 1824 rotates once for each rotation of input shaft 1822. In a fourth driving speed, the control system activates second clutch 1852 and second brake 1858 so that output shaft 1824 rotates faster than input shaft 1822. In reverse, the control system activates third clutch 1854 and first brake 1856 so that output shaft 1824 rotates at a rate slower than input shaft 1822 and in a direction opposite to that of output shaft 1824 in the first through fourth driving speeds.

FIG. 40 is a table, similar to the table of FIG. 4, including the relative amounts of friction loss occurring at clutches 1850, 1852, and 1854 and at brakes 1856 and 1858 for each of the gear ratios of the transmission shown in FIG. 39. FIG. 40 also shows the total relative amount of friction loss for each gear ratio of the transmission and for each clutch 1850, 1852, 1854 and brake 1856 and 1858 of the transmission. In addition, the bottom row and right end column of the table include a comparison between the transmission shown in FIG. 39 and the prior art transmission shown in FIG. 3.

As compared to the prior art transmission of FIG. 3, and as shown in FIG. 40, the transmission of FIG. 39 has a 57% reduction in friction loss at first clutch 1850, a 57% reduction in friction loss at third clutch 1854, a 28% reduction of friction loss in the first driving speed, a 28% reduction of friction loss in the second driving speed, a 40% reduction of friction loss in the fourth driving speed, a 30% reduction of friction loss in reverse, and a 28% overall reduction of friction loss. When the transmission of FIG. 39 is installed in a vehicle, these reductions of friction loss decrease the amount of power loss and improve vehicle fuel efficiency.

One possible reason for the decreased friction loss in the transmission of FIG. 39 is because deactivated clutches and brakes are not positioned adjacent to the fastest rotating components of the transmission.

The brakes and clutches in each of the embodiments are preferably configured so that they prevent slippage of respective components. As shown in the drawings, the brakes preferably include a portion attached to static structure of the transmission, such as the transmission casing, so that the brakes are capable of preventing rotational motion of respective components when they are activated (engaged). Although the drawings schematically show disc clutches and disc brakes in each of the above mentioned embodiments, any type of clutch or brake structure could be used in the practice of the invention. For example, one or more of the brakes could be band brakes.

Preferably, in each of the embodiments, the elements (first sun gear, first carrier, and first ring gear) of the first gear set and the elements (second sun gear, second carrier, and second ring gear) of the second gear set having a direct connection lack a clutch positioned between them.

Although the schematic drawings of each the embodiments show shafts providing input and output structures directly connected to the elements of the gear sets, different types of input or output structures can be used. For example, one or more gears could be connected to or engaged with the input element or output element of the gear sets to provide for respective input or output of rotational motion.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A transmission comprising:
   a first simple, single pinion, planetary gear set having first, second, and third elements, the first element of the first gear set receiving rotational motion input to the transmission,
      the first element of the first gear set being a first sun gear,
      the second element of the first gear set being a first carrier, and
      the third element of the first gear set being a first ring gear;
   a second simple, single pinion, planetary gear set having first, second, and third elements, the first element of the second gear set outputting rotational motion from the transmission, the third element of the second gear set being connected to the third element of the first gear set,
      the first element of the second gear set being a second ring gear,
      the second element of the second gear set being a second carrier, and
      the third element of the second gear set being a second sun gear;
   a first clutch selectively coupling the second element of the first gear set to the second element of the second gear set;
   a second clutch selectively coupling the first element of the first gear set to the second element of the second gear set;
   a third clutch selectively coupling two elements selected from the group consisting of the third element of the second gear set and the first, second, and third elements of the first gear set;
   a first brake selectively braking the second element of the second gear set; and
   a second brake selectively braking the third element of the second gear set.

2. The transmission of claim 1, wherein the third clutch selectively couples the first element of the first gear set to the second element of the first gear set.

3. The transmission of claim 1, wherein the third clutch selectively couples the first element of the first gear set to the third element of the first gear set.

4. The transmission of claim 1, wherein the third clutch selectively couples the first element of the first gear set to the third element of the second gear set.

5. The transmission of claim 1, wherein the third clutch selectively couples the second element of the first gear set to the third element of the first gear set.

6. A transmission comprising:
   a first simple, single pinion, planetary gear set having first, second, and third elements, the first element of the first gear set receiving rotational motion input to the transmission,
      the first element of the first gear set being a first sun gear,
      the second element of the first gear set being a first carrier, and
      the third element of the first gear set being a first ring gear;
   a second simple, double pinion, planetary gear set having first, second, and third elements, the first element of the second gear set outputting rotational motion from the transmission, the third element of the second gear set being connected to the third element of the first gear set,
      the first element of the second gear set being a second carrier,
      the second element of the second gear set being a second ring gear, and
      the third element of the second gear set being a second sun gear;
   a first clutch selectively coupling the second element of the first gear set to the second element of the second gear set;
   a second clutch selectively coupling the first element of the first gear set to the second element of the second gear set;
   a third clutch selectively coupling two elements selected from the group consisting of the third element of the second gear set and the first, second, and third elements of the first gear set;
   a first brake selectively braking the second element of the second gear set; and
   a second brake selectively braking the third element of the second gear set.

7. The transmission of claim 6, wherein the third clutch selectively couples the first element of the first gear set to the second element of the first gear set.

8. The transmission of claim 6, wherein the third clutch selectively couples the first element of the first gear set to the third element of the first gear set.

9. The transmission of claim 6, wherein the third clutch selectively couples the first element of the first gear set to the third element of the second gear set.

10. The transmission of claim 6, wherein the third clutch selectively couples the second element of the first gear set to the third element of the first gear set.

11. A transmission comprising:
   a first simple, double pinion, planetary gear set having first, second, and third elements, the first element of the first gear set receiving rotational motion input to the transmission,
      the first element of the first gear set being a first sun gear,
      the second element of the first gear set being a first ring gear, and
      the third element of the first gear set being a first carrier;
   a second simple, double pinion, planetary gear set having first, second, and third elements, the first element of the second gear set outputting rotational motion from the transmission, the third element of the second gear set being connected to the third element of the first gear set,
      the first element of the second gear set being a second carrier,
      the second element of the second gear set being a second ring gear, and
      the third element of the second gear set being a second sun gear;
   a first clutch selectively coupling the second element of the first gear set to the second element of the second gear set;
   a second clutch selectively coupling the first element of the first gear set to the second element of the second gear set;
   a third clutch selectively coupling two elements selected from the group consisting of the third element of the second gear set and the first, second, and third elements of the first gear set;
   a first brake selectively braking the second element of the second gear set; and
   a second brake selectively braking the third element of the second gear set.

12. The transmission of claim 11, wherein the third clutch selectively couples the first element of the first gear set to the second element of the first gear set.

13. The transmission of claim 11, wherein the third clutch selectively couples the first element of the first gear set to the third element of the first gear set.

14. The transmission of claim 11, wherein the third clutch selectively couples the first element of the first gear set to the third element of the second gear set.

15. The transmission of claim 11, wherein the third clutch selectively couples the second element of the first gear set to the third element of the first gear set.

16. A transmission comprising:
   a first simple, double pinion, planetary gear set having first, second, and third elements, the first element of the first gear set receiving rotational motion input to the transmission,
      the first element of the first gear set being a first carrier,
      the second element of the first gear set being a first ring gear, and
      the third element of the first gear set being a first sun gear;
   a second simple, double pinion, planetary gear set having first, second, and third elements, the first element of the second gear set outputting rotational motion from the transmission, the third element of the second gear set being connected to the third element of the first gear set,
      the first element of the second gear set being a second carrier,
      the second element of the second gear set being a second ring gear, and
      the third element of the second gear set being a second sun gear;
   a first clutch selectively coupling the second element of the first gear set to the second element of the second gear set;
   a second clutch selectively coupling the first element of the first gear set to the second element of the second gear set;
   a third clutch selectively coupling two elements selected from the group consisting of the third element of the second gear set and the first, second, and third elements of the first gear set;
   a first brake selectively braking the second element of the second gear set; and
   a second brake selectively braking the third element of the second gear set.

17. The transmission of claim 16, wherein the third clutch selectively couples the first element of the first gear set to the second element of the first gear set.

18. The transmission of claim 16, wherein the third clutch selectively couples the first element of the first gear set to the third element of the first gear set.

19. The transmission of claim 16, wherein the third clutch selectively couples the first element of the first gear set to the third element of the second gear set.

20. The transmission of claim 16, wherein the third clutch selectively couples the second element of the first gear set to the third element of the first gear set.

21. A transmission comprising:
   a first simple planetary gear set having first, second, and third elements, the first element of the first gear set receiving rotational motion input to the transmission;
   a second simple planetary gear set having first, second, and third elements, the first element of the second gear set outputting rotational motion from the transmission and the third element of the second gear set being connected to the third element of the first gear set;
   a first clutch selectively coupling the second element of the first gear set to the second element of the second gear set;
   a second clutch selectively coupling the first element of the first gear set to the second element of the second gear set;
   a third clutch selectively coupling the first element of the first gear set to the second element of the first gear set;
   a first brake selectively braking the second element of the second gear set; and
   a second brake selectively braking the third element of the second gear set.

22. The transmission of claim 21, wherein the elements of the first gear set include a first sun gear, a first carrier, and a first ring gear, and the elements of the second gear set include a second sun gear, a second carrier, and a second ring gear.

23. A transmission comprising:
- a first simple planetary gear set having first, second, and third elements, the first element of the first gear set receiving rotational motion input to the transmission;
- a second simple planetary gear set having first, second, and third elements the first element of the second gear set outputting rotational motion from the transmission and the third element of the second gear set being connected to the third element of the first gear set;
- a first clutch selectively coupling the second element of the first gear set to the second element of the second gear set;
- a second clutch selectively coupling the first element of the first gear set to the second element of the second gear set;
- a third clutch selectively coupling the second element of the first gear set to the third element of the first gear set;
- a first brake selectively braking the second element of the second gear set; and
- a second brake selectively braking the third element of the second gear set.

24. The transmission of claim 23, wherein the elements of the first gear set include a first sun gear, a first carrier, and a first ring gear, and the elements of the second gear set include a second sun gear, a second carrier, and a second ring gear.

25. A transmission comprising:
- a first simple, double pinion, planetary gear set having first, second, and third elements, the first element of the first gear set receiving rotational motion input to the transmission,
    - the first element of the first gear set being a first sun gear,
    - the second element of the first gear set being a first ring gear, and
    - the third element of the first gear set being a first carrier;
- a second simple, single pinion, planetary gear set having first, second, and third elements, the first element of the second gear set outputting rotational motion from the transmission, the third element of the second gear set being connected to the third element of the first gear set,
    - the first element of the second gear set being a second ring gear,
    - the second element of the second gear set being a second carrier, and
    - the third element of the second gear set being a second sun gear;
- a first clutch selectively coupling the second element of the first gear set to the second element of the second gear set;
- a second clutch selectively coupling the first element of the first gear set to the second element of the second gear set;
- a third clutch selectively coupling the first element of the first gear set to the second element of the first gear set;
- a first brake selectively braking the second element of the second gear set; and
- a second brake selectively braking the third element of the second gear set.

26. A transmission comprising:
- a first simple, double pinion, planetary gear set having first, second, and third elements, the first element of the first gear set receiving rotational motion input to the transmission,
    - the first element of the first gear set being a first sun gear,
    - the second element of the first gear set being a first ring gear, and
    - the third element of the first gear set being a first carrier;
- a second simple, single pinion, planetary gear set having first, second, and third elements, the first element of the second gear set outputting rotational motion from the transmission, the third element of the second gear set being connected to the third element of the first gear set,
    - the first element of the second gear set being a second ring gear,
    - the second element of the second gear set being a second carrier, and
    - the third element of the second gear set being a second sun gear;
- a first clutch selectively coupling the second element of the first gear set to the second element of the second gear set;
- a second clutch selectively coupling the first element of the first gear set to the second element of the second gear set;
- a third clutch selectively coupling the second element of the first gear set to the third element of the first gear set;
- a first brake selectively braking the second element of the second gear set; and
- a second brake selectively braking the third element of the second gear set.

27. A transmission comprising:
- a first simple, double pinion, planetary gear set having first, second, and third elements, the first element of the first gear set receiving rotational motion input to the transmission,
    - the first element of the first gear set being a first carrier,
    - the second element of the first gear set being a first ring gear, and
    - the third element of the first gear set being a first sun gear;
- a second simple, single pinion, planetary gear set having first, second, and third elements, the first element of the second gear set outputting rotational motion from the transmission, the third element of the second gear set being connected to the third element of the first gear set,
    - the first element of the second gear set being a second ring gear,
    - the second element of the second gear set being a second carrier, and
    - the third element of the second gear set being a second sun gear;
- a first clutch selectively coupling the second element of the first gear set to the second element of the second gear set;
- a second clutch selectively coupling the first element of the first gear set to the second element of the second gear set;
- a third clutch selectively coupling the third clutch selectively couples the first element of the first gear set to the second element of the first gear set;

a first brake selectively braking the second element of the second gear set; and a second brake selectively braking the third element of the second gear set.

28. A transmission comprising:

a first simple, double pinion, planetary gear set having first, second, and third elements, the first element of the first gear set receiving rotational motion input to the transmission,
  the first element of the first gear set being a first carrier,
  the second element of the first gear set being a first ring gear, and
  the third element of the first gear set being a first sun gear;

a second simple, single pinion, planetary gear set having first, second, and third elements, the first element of the second gear set outputting rotational motion from the transmission, the third element of the second gear set being connected to the third element of the first gear set,
  the first element of the second gear set being a second ring gear,
  the second element of the second gear set being a second carrier, and
  the third element of the second gear set being a second sun gear;

a first clutch selectively coupling the second element of the first gear set to the second element of the second gear set;

a second clutch selectively coupling the first element of the first gear set to the second element of the second gear set;

a third clutch selectively coupling the second element of the first gear set to the third element of the first gear set;

a first brake selectively braking the second element of the second gear set; and a second brake selectively braking the third element of the second gear set.

* * * * *